US009499964B2

(12) United States Patent
Yamasaki et al.

(10) Patent No.: US 9,499,964 B2
(45) Date of Patent: Nov. 22, 2016

(54) FLUSH WATER SUPPLY DEVICE, FLUSH WATER TANK ASSEMBLY WITH FLUSH WATER SUPPLY DEVICE, AND FLUSH TOILET WITH FLUSH WATER TANK ASSEMBLY

(71) Applicant: TOTO LTD., Fukuoka (JP)

(72) Inventors: Atsuko Yamasaki, Kitakyushu (JP); Yuichi Oda, Yukuhashi (JP); Yukinori Kubozono, Kitakyushu (JP); Hisashi Koga, Kitakyushu (JP); Haruki Matsuda, Chikujo-gun (JP)

(73) Assignee: TOTO LTD., Fukuoka (JP)

( * ) Notice: Subject to any disclaimer, the term of this patent is extended or adjusted under 35 U.S.C. 154(b) by 346 days.

(21) Appl. No.: 13/770,165

(22) Filed: Feb. 19, 2013

(65) Prior Publication Data

US 2013/0212794 A1 Aug. 22, 2013

(30) Foreign Application Priority Data

Feb. 22, 2012 (JP) .................................. 2012-036541
Mar. 29, 2012 (JP) .................................. 2012-077385
Jul. 31, 2012 (JP) .................................. 2012-170276

(51) Int. Cl.
*E03D 1/30* (2006.01)
*E03D 1/32* (2006.01)
*F16K 31/34* (2006.01)

(52) U.S. Cl.
CPC .................. *E03D 1/306* (2013.01); *E03D 1/32* (2013.01); *F16K 31/34* (2013.01)

(58) Field of Classification Search
CPC .......... E03D 1/33; F16K 21/18; F16K 31/26; F16K 31/34; F16K 33/00
USPC ............. 4/331; 137/409–411, 429, 437, 448, 137/451
See application file for complete search history.

(56) References Cited

U.S. PATENT DOCUMENTS 1,107,268 A 8/1914 Davis
1,146,558 A 7/1915 Fenton
(Continued)

FOREIGN PATENT DOCUMENTS

CN 2748529 12/2005
GB 2336605 10/1999
(Continued)

OTHER PUBLICATIONS

JP 2009243053 Machine Translation.*
(Continued)

*Primary Examiner* — Paul R Durand
*Assistant Examiner* — William R Klotz
(74) *Attorney, Agent, or Firm* — Brooks Kushman P.C.

(57) ABSTRACT

A flush water supply device includes: a water supply unit including a water supply valve; a water compartment fittingly attached to the water supply unit; a float provided inside the water compartment; and a swingable member having one end connected to the float and the other end connected to the water supply valve, wherein the water compartment is formed in a flattened shape in which a maximum vertical length becomes less than a maximum horizontal length by a given value, and a ratio of a distance between the fulcrum adjacent to the water supply valve and an effort point defined by the swingable member and the float, to a distance between the fulcrum adjacent to the water supply valve and a load point defined by the swingable member and the water supply valve is set to a given value or more.

19 Claims, 22 Drawing Sheets

(56) References Cited

U.S. PATENT DOCUMENTS

| | | |
|---|---|---|
| 2,607,364 A | 8/1952 | Smith |
| 2,752,936 A | 7/1956 | Cantalupo |
| 3,610,271 A | 10/1971 | Jarvis |
| 3,709,246 A | 1/1973 | Kachergis |
| 3,832,739 A * | 9/1974 | Campiglia ............ 4/366 |
| 4,080,986 A | 3/1978 | Schoepe |
| 4,135,263 A | 1/1979 | Anderson |
| 4,338,964 A | 7/1982 | Schoepe |
| 4,945,944 A | 8/1990 | Chen |
| 5,073,995 A | 12/1991 | Jennison et al. |
| 5,255,703 A * | 10/1993 | Johnson .............. 137/428 |
| 5,280,803 A | 1/1994 | Swift et al. |
| 5,337,781 A | 8/1994 | Johnson |
| 5,421,361 A | 6/1995 | Johnson |
| 5,439,025 A | 8/1995 | Johnson |
| 5,623,961 A * | 4/1997 | Nichols-Roy ......... 137/377 |
| 5,715,859 A * | 2/1998 | Nichols-Roy ......... 137/426 |
| 5,836,346 A | 11/1998 | Nichols-Roy |
| 5,878,775 A | 3/1999 | Tamburro, Jr. |
| 5,904,176 A | 5/1999 | Li |
| 5,926,861 A | 7/1999 | Frost |
| 5,964,247 A * | 10/1999 | Johnson .............. 137/414 |
| 5,975,125 A | 11/1999 | Nichols-Roy |
| 6,003,541 A | 12/1999 | Nichols-Roy |
| 6,047,725 A | 4/2000 | Gish et al. |
| 6,142,174 A | 11/2000 | Nichols-Roy |
| 6,155,288 A | 12/2000 | Johnson |
| 6,199,581 B1 | 3/2001 | Gil |
| 6,260,574 B1 * | 7/2001 | Nichols-Roy ......... 137/414 |
| 6,478,044 B2 | 11/2002 | Howe |
| 6,510,866 B2 * | 1/2003 | Li ....................... 137/426 |
| 6,659,125 B1 | 12/2003 | Autunez |
| 6,666,228 B1 * | 12/2003 | Li ....................... 137/426 |
| 6,679,285 B2 | 1/2004 | Pablo |
| 6,755,209 B2 * | 6/2004 | Wey ..................... 137/414 |
| 6,874,172 B2 | 4/2005 | Frost |
| 6,913,035 B2 * | 7/2005 | Huang ................. 137/444 |
| 7,219,375 B2 | 5/2007 | Steadman |
| 7,661,438 B2 | 2/2010 | Nichols-Roy et al. |
| 8,166,997 B2 * | 5/2012 | Fukuzawa et al. ... 137/444 |
| 2006/0196550 A1 | 9/2006 | Schuster et al. |
| 2008/0078454 A1 * | 4/2008 | Nichols-Roy et al. ... 137/411 |
| 2010/0212756 A1 * | 8/2010 | Guthrie ................. 137/409 |
| 2012/0318382 A1 | 12/2012 | Magar |
| 2014/0048157 A1 * | 2/2014 | Fu ........................ 137/409 |

FOREIGN PATENT DOCUMENTS

| | | |
|---|---|---|
| JP | 59145844 | 8/1984 |
| JP | 61072144 | 4/1986 |
| JP | 63289131 | 11/1988 |
| JP | 3025663 | 7/1990 |
| JP | 10508667 | 8/1998 |
| JP | 2001507415 | 6/2001 |
| JP | 2003027552 | 1/2003 |
| JP | 2006274540 | 10/2006 |
| JP | 2006300112 | 11/2006 |
| JP | 2008057161 | 3/2008 |
| JP | 2009243053 | 10/2009 |
| JP | 2009243053 A * | 10/2009 |
| JP | 2010209552 | 9/2010 |
| JP | 2011064009 | 3/2011 |
| JP | 2012132167 | 7/2012 |
| WO | 2011107711 | 9/2011 |

OTHER PUBLICATIONS

Chinese Office Action for Chinese Application No. CN 201310054760.6, Issued by the Chinese Patent Office on Jul. 1, 2015, 4 Pages.

Machine Translation for Japanese reference JP 2009243053, Retrieved from the Japanese Patent Office on Aug. 5, 2015, All together 21 Pages.

* cited by examiner

FLUSH WATER SUPPLY DEVICE, FLUSH WATER TANK ASSEMBLY WITH FLUSH WATER SUPPLY DEVICE, AND FLUSH TOILET WITH FLUSH WATER TANK ASSEMBLY

TECHNICAL FIELD

The present invention relates to a flush water supply device, a flush water tank assembly equipped with the flush water supply device, and a flush toilet equipped with the flush water tank assembly, and, more particularly, to a flush water supply device for supplying flush water to a flush water tank of a toilet, a flush water tank assembly equipped with the flush water supply device, and a flush toilet equipped with the flush water tank assembly.

BACKGROUND ART

Heretofore, as a flush water supply device for supplying flush water to a flush water tank of a toilet, there has been known one type which comprises a small tank formed in a tub-like shape having a bottom with an opening to serve as a water compartment, and a float provided inside the small tank, wherein the float is adapted, when flush water held in the small tank is drained from the opening, to be lowered along with a lowering of a water level within the small tank, causing a water supply valve to be opened interlockingly with the float, as described, for example, the following Patent Document 1 (JP 2011-064009A).

SUMMARY OF THE INVENTION

Technical Problem

However, in the conventional flush water supply device described in the Patent Document 1, flush water held in the small tank can be drained only if a water level within the flush water tank becomes lower than a position of the opening of the bottom of the small tank, which causes a problem that, as long as the water level within the flush water tank is located above the position of the opening of the bottom of the small tank, the water supply valve cannot be opened even if it is attempted to open the water supply valve so as to supply water. Moreover, if a period of time (delay time) after start of discharge of flush water in the flush water tank through until start of supply of flush water to the flush water tank through the flush water supply device become prolonged, a problem comes up that a user is likely to misunderstand such a situation as a malfunction of the flush water supply device.

Further, in connection with a recent increasing need for saving flush water to be used for toilet flushing, an amount of flush water to be reserved in the flush water tank is set to be as small as possible, so that a difference in height between a water-stopping water level and a post-discharge dead water level (DWL) of flush water in the flush water tank becomes reduced. A need arising under such a situation where the amount and the water-level difference of flush water in the flush water tank are set in restricted ranges is how to stably perform opening and closing operations (water supplying and water stopping operations) of the water supply valve.

The present invention has been made to solve the problems in the above conventional technique and meet the above need, and an object thereof is to provide a flush water supply device capable of stably draining flush water in a water compartment, and thereby ensuring reliable.

Solution to Problem

In order to achieve the object, according to a first aspect of the present invention, there is provided a flush water supply device for supplying flush water to a flush water tank of a toilet. The flush water supply device comprises: a water supply unit which includes a water supply pipe having an upstream end connected to an external water supply source, and a water supply valve provided above and in laterally offset relation to the water supply pipe and adapted to be switchable between a water supplying state and a water stopping state with respect of an inside of the flush water tank, in terms of flush water supplied from the water supply pipe; a water compartment fittingly attached to the water supply unit and adapted to hold therein flush water; an openable/closable valve for opening and closing an opening formed in a bottom wall or a lateral wall of the water compartment; a float provided inside the water compartment and adapted to be moved upwardly and downwardly according to a change in water level within the water compartment; and a swingable member having one end connected to the float and the other end connected to the water supply valve of the water supply unit, wherein the swingable member is adapted, according to the upward and downward movements of the float, to be swingably moved about a fulcrum located adjacent to the water supply valve, thereby causing opening and closing of the water supply valve. In the flush water supply device, the water compartment is formed in a flattened shape in which a maximum vertical length becomes less than a maximum horizontal length by a given value, and a ratio (lever ratio L1/L2) of a distance (L1) between the fulcrum adjacent to the water supply valve and an effort point defined by the swingable member and the float, to a distance (L2) between the fulcrum adjacent to the water supply valve and a load point defined by the swingable member and the water supply valve is set to a given value or more.

In the flush water supply device of the present invention, the water compartment is formed in a flattened shape in which a maximum vertical length becomes less than a maximum horizontal length by a given value. Thus, even in a situation where, in order to save an amount of flush water to be used for flushing of the flush toilet, a height difference between a water-stopping water level and a dead water level within the flush water tank is set to a relatively small value, it becomes possible to stably drain flush water in the water compartment, as compared to a water compartment having a non-flattened shape such as a cubic shape, so that the flush water supply device can ensure reliability. In addition, the water supply valve is provided in laterally offset relation to the water supply pipe. Thus, even in a situation where the water compartment is formed in a flattened shape so that it becomes impossible to ensure a sufficient water level within the water compartment after completion of water supply from the water supply unit to the flush water tank, causing difficulty in obtaining buoyancy enough to move the float upwardly depending on the water level within the water compartment, it becomes possible to sufficiently ensure the distance (L1) between the fulcrum adjacent to the water supply valve and the effort point defined by the swingable member and the float. That is, the ratio (lever ratio L1/L2) of the distance (L1), to the distance (L2) between the fulcrum adjacent to the water supply valve and the load point defined by the swingable member and the water supply valve can be set to a given value or more. Therefore, even in a situation where the buoyancy causing the upward movement of the float according to the water level within the water compartment is relatively small, and a force acting on a connection point (effort point) defined by the swingable member and the float is relatively small, it becomes possible to facilitate the swinging movement of the swingable member about the fulcrum adjacent to the water supply valve, thereby promptly opening the water supply valve. Thus, the height difference between the water-stopping water level and the dead water level within the flush water tank can be set to a smaller value, so that an amount of flush water to be used for flushing of the flush toilet can be set to a smaller value.

Preferably, in the flush water supply device of the present invention, the openable/closable valve is made of a material having a specific gravity less than that of water, so as to become capable of being moved upwardly and downwardly depending on a flush water level within the flush water tank.

According to this feature, the openable/closable valve itself is made of a material having a specific gravity less than that of water, so that it becomes possible to stably move the openable/closable valve upwardly and downwardly according to the flush water level within the flush water tank, thereby stably closing and opening the opening of the water compartment. Further, it is possible to eliminate a need for an air holding space for producing the buoyancy causing the upward movement of the openable/closable valve, thereby suppressing an increase in size of the openable/closable valve in an up-down direction. On the other hand, when the water level within the flush water tank is raised, the openable/closable valve can quickly close the opening of the water compartment by means of buoyancy, according to the water level within the flush water tank. Thus, just before the water level within the flush water tank is raised beyond an upper edge of the water compartment to cause flush water to flow into the water compartment, the inside of the water compartment can be kept vacant to allow the float to be kept at its lowermost position. Then, when flush water flows into the water compartment beyond the upper edge of the water compartment, the float can be quickly moved upwardly to promptly set the water supply valve to the water stopping state.

Preferably, in the flush water supply device of the present invention, the bottom wall of the water compartment is formed with a small hole for draining flush water therethrough, in addition to the opening.

According to this feature, the bottom wall of the water compartment is formed with a small hole for draining flush water therethrough, in addition to the opening, so that flush water in the water compartment can be quickly drained from the opening and the small hole. Therefore, as compared to cases where the bottom wall of the water compartment is not formed with the small hole, it becomes possible to reduce a movement distance of the openable/closable valve required for opening the opening, and stably drain flush water in the water compartment only by a slight downward movement of the openable/closable valve. Thus, the flush water supply device can ensure reliability.

In the flush water supply device of the present invention, the openable/closable valve may have a small hole formed in a central region thereof to penetrate therethrough in an up-down direction.

According to this feature, the openable/closable valve has a small hole formed in a central region thereof to penetrate therethrough in an up-down direction, so that flush water in the water compartment can also be promptly drained from the small hole of the openable/closable valve via the opening. Therefore, as compared to cases where the small hole is not formed in the openable/closable valve, it becomes possible to reduce a movement distance of the openable/closable valve required for opening the opening, and stably drain flush water in the water compartment only by a slight downward movement of the openable/closable valve. Thus, the flush water supply device can ensure reliability.

Preferably, in the flush water supply device of the present invention, the opening comprises a mounting hole formed in the bottom wall of the water compartment and to which the openable/closable valve is attached, and a small hole adapted, when the openable/closable valve is moved upwardly and downwardly according to a change in water level within the flush water tank, to be closed and opened to drain flush water in the water compartment.

According to this feature, the opening comprises a mounting hole formed in the bottom wall of the water compartment and to which the openable/closable valve is attached, and a small hole adapted, when the openable/closable valve is moved upwardly and downwardly according to a change in water level within the flush water tank, to be closed and opened to drain flush water in the water compartment, so that a timing of water supply from the water supply unit into the flush water tank can be adequately controlled. Thus, it becomes possible to prevent the occurrence of a phenomenon, so-called "tail flushing", that, when flush water is being supplied from the flush water tank to a toilet bowl, water supply is started at a timing earlier than a desired timing, and thus the supplied flush water is discharged as wasteful water to the toilet bowl together with flush water preliminarily stored in the flush water tank, or to prevent the occurrence of a situation where the timing of water supply becomes later than a desired timing, and thus it needs to take a longer time for fully storing flush water in the flush water tank.

Preferably, in the above flush water supply device, the bottom wall of the water compartment is formed with a tubular member extending upwardly while surrounding a periphery of the mounting hole.

According to this feature, the bottom wall of the water compartment is formed with a tubular member extending upwardly while surrounding a periphery of the mounting hole for allowing the openable/closable valve to be attached thereto, so that it becomes possible to prevent flush water in the water compartment from flowing out of the mounting hole for the openable/closable valve, thereby adequately controlling a timing of water supply from the water supply unit into the flush water tank. Thus, it becomes possible to prevent the occurrence of a phenomenon, so-called "tail flushing", that, when flush water is being supplied from the flush water tank to a toilet bowl, water supply is started at a timing earlier than a desired timing, and thus the supplied flush water is discharged as wasteful water to the toilet bowl together with flush water preliminarily stored in the flush water tank, or to prevent the occurrence of a situation where the timing of water supply becomes later than a desired timing, and thus it needs to take a longer time for fully storing flush water in the flush water tank.

Preferably, in the above flush water supply device, the tubular member is formed to have an upper end opened upwardly, and disposed inside the float, wherein the upper end of the tubular member is located above a lower end of the float in a situation where the float is moved upwardly during the water stopping state and then located at a position where a balance between a self-weight of the float and buoyancy based on flush water in the water compartment is achieved.

According to this feature, the upper end of the tubular member is located above the lower end of the float in the situation where the float is moved upwardly during the water stopping state and then located at the position where the balance between the self-weight of the float and buoyancy based on flush water in the water compartment is achieved. Therefore, even if the upper end of the tubular member is opened upwardly, it becomes possible to prevent intrusion of water from the inside of the water compartment into the tubular member, and prevent outflow of flush water in the water compartment from the mounting hole for the openable/closable valve. Thus, it becomes possible to adequately control the timing of water supply from the water supply unit into the flush water tank. In addition, the tubular member can be formed in a simple and compact structure. Further, the tubular member is disposed inside the float, so that it becomes possible to avoid interference between the tubular member and the float so as to prevent erroneous movements of the float.

Alternatively, the tubular member may be formed to have an upper end opened upwardly, and disposed outside an internal space of the float, wherein the upper end of the tubular member is located above a water level within the water compartment during the water stopping state.

According to this feature, the tubular member is disposed outside the internal space of the float, wherein the upper end of the tubular member is located above the water level within the water compartment during the water stopping state. Therefore, even if the upper end of the tubular member is an open end, it becomes possible to prevent intrusion of water from the inside of the water compartment into the tubular member, and prevent outflow of flush water in the water compartment from the mounting hole for the openable/closable valve. Thus, it becomes possible to adequately control the timing of water supply from the water supply unit into the flush water tank. In addition, the tubular member can be formed in a simple structure. Further, the tubular member is disposed outside the internal space of the float. Thus, it becomes possible to avoid interference between the tubular member and the float so as to prevent erroneous movements of the float.

Alternatively, the tubular member may be formed to have an upper end closed upwardly.

According to this feature, the upper end of the tubular member is a closed end, so that it becomes possible to prevent intrusion of water from the inside of the water compartment into the tubular member, and prevent outflow of flush water in the water compartment from the mounting hole for the openable/closable valve. Thus, it becomes possible to adequately control the timing of water supply from the water supply unit into the flush water tank. In addition, a height dimension of the tubular member can be set to a small value, so that the tubular member can be formed in a compact structure.

Preferably, in the above flush water supply device, the openable/closable valve has: a buoyancy producing section for producing buoyancy based on flush water in the flush water tank; a support section inserted into the mounting hole and adapted to be slidingly movable along the mounting hole in an up-down direction according to the buoyancy produced by the buoyancy producing section; and a valve section adapted to be moved upwardly and downwardly according to a change in water level within the flush water tank, thereby closing and opening the small hole of the water compartment, wherein the support section of the openable/closable valve has a lockable portion adapted to be locked by the upper end of the tubular member when the openable/closable valve is moved downwardly to a lowermost position with respect to the water compartment.

According to this feature, the lockable portion is locked by the upper end of the tubular member when the openable/closable valve is moved downwardly to the lowermost position with respect to the water compartment, thereby preventing the openable/closable valve from dropping off from the water compartment. Further, the lockable portion of the support section of the openable/closable is locked directly by the upper end of the tubular member, so that it becomes possible to eliminate a need for additionally providing means to lock the lockable portion of the support section of the openable/closable valve, thereby providing a simple structure.

Alternatively, the openable/closable valve may have: a buoyancy producing section for producing buoyancy based on flush water in the flush water tank; a support section inserted into the mounting hole and adapted to be slidingly movable along the mounting hole in an up-down direction according to the buoyancy produced by the buoyancy producing section; and a valve section adapted to be moved upwardly and downwardly according to a change in water level within the flush water tank, thereby closing and opening the small hole of the water compartment, wherein the support section of the openable/closable valve has a lockable portion adapted to be locked by a portion of the tubular member when the openable/closable valve is moved downwardly to a lowermost position with respect to the water compartment, and the tubular member has a locking stopper portion for locking the lockable portion of the support section of the openable/closable valve.

According to this feature, even when the openable/closable valve is moved downwardly to the lowermost position, the lockable portion of the support section of the openable/closable valve and the locking stopper portion on the inner surface of the tubular member can prevent drop-off of the openable/closable valve from the water compartment.

Preferably, in the flush water supply device of the present invention, the water compartment is detachably attached to a lateral side of the water supply pipe which is fixedly attached to the flush water tank.

According to this feature, the water compartment is detachably attached to the lateral side of the water supply pipe which is fixedly attached to the flush water tank. In this case, a plurality of types of water compartments each having a different capacity may be prepared, so that one of the water compartments can be replaced with another one suitable for an amount of flush water in the flush water tank. Thus, it becomes possible to stably drain flush water in the water compartment, so that the flush water supply device can ensure reliability.

Preferably, in the flush water supply device of the present invention, the water supply pipe has a convex portion formed to protrude outwardly from a lateral surface thereof and extend upwardly from a given height position of the water supply pipe, and the water compartment has a fitting portion fittingly engageable with a lateral surface of the water supply pipe, wherein a surface of the fitting portion opposed to the lateral surface of the water supply pipe has a recess formed to have a concave shape and extend in an up-down direction, in a manner fittingly engageable with the convex portion of the water supply pipe.

According to this feature, in an operation for attaching the water compartment to the water supply pipe, the water compartment is moved in a lateral direction and conformably brought into contact with a region of the water supply pipe located below a given height position. Then, the water compartment is moved upwardly to allow the convex portion of the water supply pipe to be fittingly engaged with the recess in the fitting portion of the water compartment, so that the water compartment can be replaced with another type suitable for an amount of flush water in the flush water tank, with a simple structure. Thus, it becomes possible to stably drain flush water in the water compartment, so that the flush water supply device can ensure reliability.

Alternatively, the water supply pipe may have a recess formed to have a shape concaved inwardly from a lateral surface thereof and extend upwardly from a given height position of the water supply pipe, and the water compartment may have a fitting portion fittingly engageable with a lateral surface of the water supply pipe, wherein a surface of the fitting portion opposed to the lateral surface of the water supply pipe has a convex portion formed to have a convex shape and extend in an up-down direction, in a manner fittingly engageable with the recess of the water supply pipe.

According to this feature, in an operation for attaching the water compartment to the water supply pipe, the water compartment is moved in a lateral direction and conformably brought into contact with a region of the water supply pipe located below a given height position. Then, the water compartment is moved upwardly to allow the recess of the water supply pipe to be fittingly engaged with the convex portion in the fitting portion of the water compartment, so that the water compartment can be replaced with another type suitable for an amount of flush water in the flush water tank, with a simple structure. Thus, it becomes possible to stably drain flush water in the water compartment, so that the flush water supply device can ensure reliability.

Preferably, in the above flush water supply device, the water compartment is formed to partially surround an outer peripheral surface of the water supply pipe in a state in which the water compartment is fittingly engaged with the water supply pipe, and an internal shape of the water compartment for receiving therein flush water is formed in a generally C shape in top plan view, and the float is formed in conformity to the internal shape of the water compartment.

According to this feature, the water compartment is formed to partially surround the outer peripheral surface of the water supply pipe in the state in which the water compartment is fittingly engaged with the water supply pipe, so that a vertical height dimension of the water compartment can be set to a small value, while allowing the water compartment to be detachably attached to the water supply pipe. If the vertical height dimension of the water compartment is simply set to a small value, so as to allow the water compartment to be formed in a flattened shape in which a maximum vertical length becomes less than a maximum horizontal length by a given value, a height of the water level within the water compartment mall becomes relatively low, thereby causing difficulty in sufficiently obtaining buoyancy of the float. In this regard, the water compartment is formed in a generally C shape in top plan view, and the float is formed to have an outer peripheral shape approximately conforming to the internal shape of the water compartment, thereby making it possible to increase a pressure-receiving surface area of the float to increase the buoyancy. Thus, the float can be stably moved upwardly to stably set the water supply valve to the water stopping state, so that the flush water supply device can ensure reliability.

Preferably, in the flush water supply device of the present invention, the water supply valve is a diaphragm-operated water supply valve provided above and in laterally offset relation to the water supply pipe, wherein the water supply valve is formed with a pilot hole communicating with the water supply pipe and extending in an approximately horizontal direction, and adapted to be moved in a horizontal direction so as to open and close the pilot hole in a manner switchable between the water supplying state and the water stopping state with respect to the inside of the flush water tank, and wherein the water compartment is opened upwardly, and adapted to hold therein flush water while being fittingly engaged with the water supply pipe, and the float is provided inside the water compartment and adapted to be moved upwardly and downwardly according to a change in water level within the water compartment, thereby cause the water supply valve to close and open the pilot hole, and wherein the water compartment and the float are disposed on an opposite side of an exit of the pilot hole of the water supply valve with respect to the water supply pipe.

According to this feature, the water compartment and the float are disposed on an opposite side of an exit of the pilot hole of the water supply valve with respect to the water supply pipe, so that, even if flush water flows out of the exit of the pilot hole when the float is moved downwardly and the water supply valve operates to open the pilot hole, it becomes possible to allow the flush water flowing out of the exit of the pilot hole to flow out on the opposite side of the water compartment and the float, thereby preventing the flush water flowing out of the exit of the pilot hole from flowing into the water compartment. Thus, it becomes possible to prevent the occurrence of an undesirable situation where, before a water-stopping water level within the flush water tank reaches a prescribed water level necessary for toilet flushing, the water level within the water compartment is raised, and the float is moved upwardly, so that the water supply valve is prematurely closed, resulting in erroneous stopping of water supply. In addition, it becomes possible to eliminate a need for providing a member for preventing flush water flowing out of the exit of the pilot hole from flowing into the water compartment, thereby avoiding an increase in entire size of the flush water supply device, and suppressing an increase in production cost of the flush water supply device.

Preferably, in the above flush water supply device, the water supply pipe has an upper end formed as a concave portion which protrudes outwardly and then protrudes upwardly from a distal end of the outwardly protruding portion, wherein the concave portion is formed to have an upper peripheral edge located outward of the exit of the pilot hole of the water supply valve, in top plan view.

According to this feature, the upper end of the water supply pipe is formed as a concave portion which protrudes outwardly and then protrudes upwardly from a distal end of the outwardly protruding portion, wherein the concave portion is formed to have an upper peripheral edge located outward of the exit of the pilot hole of the water supply valve, in top plan view. This makes it possible to reliably receive flush water flowing out of the exit of the pilot hole, by the concave portion at the upper end of the water supply pipe, thereby preventing flush water flowing out of the exit of the pilot hole from flowing into the water compartment. Thus, it becomes possible to prevent the occurrence of the undesirable situation where, before the water-stopping water level within the flush water tank reaches a prescribed water level necessary for toilet flushing, the water level within the water compartment is raised, and the float is moved upwardly, so that the water supply valve is prematurely closed, resulting in erroneous stopping of water supply.

Preferably, in the above flush water supply device, the concave portion at the upper end of the water supply pipe has a drain port formed in a lateral wall thereof at a position on an opposite side of the water compartment and the float with respect to the water supply pipe, to drain flush water in the concave portion.

According to this feature, flush water received by the concave portion at the upper end of the water supply pipe after flowing out of the exit of the pilot hole is drained from the drain port formed on the lateral surface of the concave portion at the upper end of the water supply pipe, to the opposite side of the water compartment and the float with respect to the water supply pipe, so that it becomes possible to prevent flush water flowing out of the exit of the pilot hole from flowing into the water compartment. Thus, it becomes possible to prevent the occurrence of the undesirable situation where, before the water-stopping water level within the flush water tank reaches a prescribed water level necessary for toilet flushing, the water level within the water compartment is raised, and the float is moved upwardly, so that the water supply valve is prematurely closed, resulting in erroneous stopping of water supply.

According to a second aspect of the present invention, there is provided a flush water tank assembly comprising the above flush water supply device.

The flush water tank assembly of the present invention can ensure reliability.

According to a third aspect of the present invention, there is provided a flush toilet comprising the above flush water tank assembly.

The flush toilet of the present invention can ensure reliability.

Advantageous Effect of Invention

The flush water supply device of the present invention can stably drain flush water in the water compartment, and thereby ensure reliable.

DESCRIPTION OF EMBODIMENTS

With reference to the accompanying drawings, a flush water supply device according to a first embodiment of the present invention, a flush water tank assembly equipped with the flush water supply device, and a flush toilet equipped with the flush water tank assembly, will now be described.

First of all, based on FIG. 1, a flush toilet using a flush water tank assembly equipped with the flush water supply device according to the first embodiment of the present invention will be described below.

Figure 1:
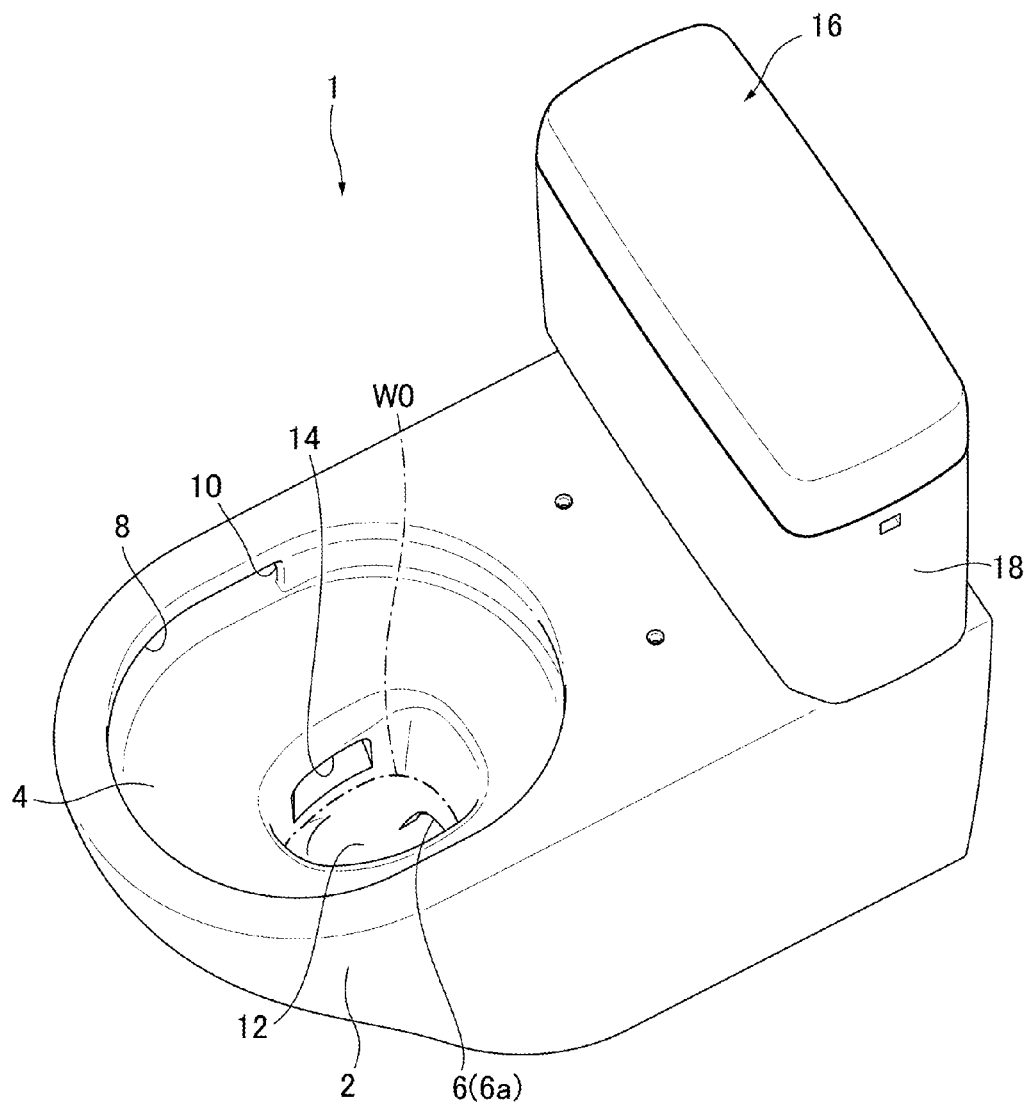
FIG. 1 is a perspective view illustrating a flush toilet using a flush water tank assembly equipped with a flush water supply device according to a first embodiment of the present invention, wherein a toilet seat and a toilet cover are removed therefrom.

FIG. 1 is a perspective view illustrating a flush toilet using a flush water tank assembly equipped with the flush water supply device according to the first embodiment of the present invention, wherein a toilet seat and a toilet cover are removed therefrom.

As illustrated in FIG. 1, the reference numeral 1 indicates a so-called siphon-type flush toilet designed to suck waste in a bowl portion and discharge the waste from a drainage trap passage to the outside at once, by means of a siphon action. The flush toilet 1 comprises a toilet main unit 2 made of porcelain. The toilet main unit 2 is formed with a bowl portion 4, and a drainage trap passage 6 communicated with a bottom of the bowl portion 4.

The bowl portion 4 of the toilet main unit 2 has an upper edge formed with an inwardly overhanging rim 8, and a first spout port 10 for spouting flush water supplied from a water conduit (not illustrated) formed inside a rear of the toilet main unit 2. Specifically, the toilet main unit 2 is configured to allow flush water spouted from the first spout port 10 to spirally whirling downwardly along an inner surface thereof to thereby flush the bowl portion 4.

The bowl portion 4 has a lower region formed as a water pooling region 12 capable of pooling water at up to a water level (pooled-water level) indicated by the one-dot chain line W0. An inlet 6a of the drainage trap passage 6 is opened at a bottom of the water pooling region 12, and an outlet of the drainage trap passage 6 located rearward of the inlet 6a is connected to a drain pipe (not illustrated) arranged under a floor, via a drain socket (not illustrated).

The bowl portion 4 further has a second spout port 14 formed at a position above the pooled-water level W0 to spout flush water supplied from the water conduit (not illustrated) formed inside the rear of the toilet main unit 2. Specifically, the toilet main unit 2 is configured to allow flush water spouted from the second spout port 14 to cause water pooled in the water pooling region 12 to have a flow whirling in an up-down direction.

A flush water tank assembly 16 is provided on an upper surface of the rear of the toilet main unit 2 to store flush water to be supplied to the toilet main unit 2.

Although the first embodiment will be described based on an example in which the flush water tank assembly 16 is applied to the above siphon-type flush toilet, a scope of application of the present invention is not limited to the siphon-type flush toilet, but the present invention can also be applied to any other type of flush toilet, such as a so-called wash down-type flush toilet designed to wash away waste by means of a water flow action caused by water head within the bowl portion.

Secondly, based on FIG. 2, an internal structure of the flush water tank assembly 16 will be described below.

Figure 2:
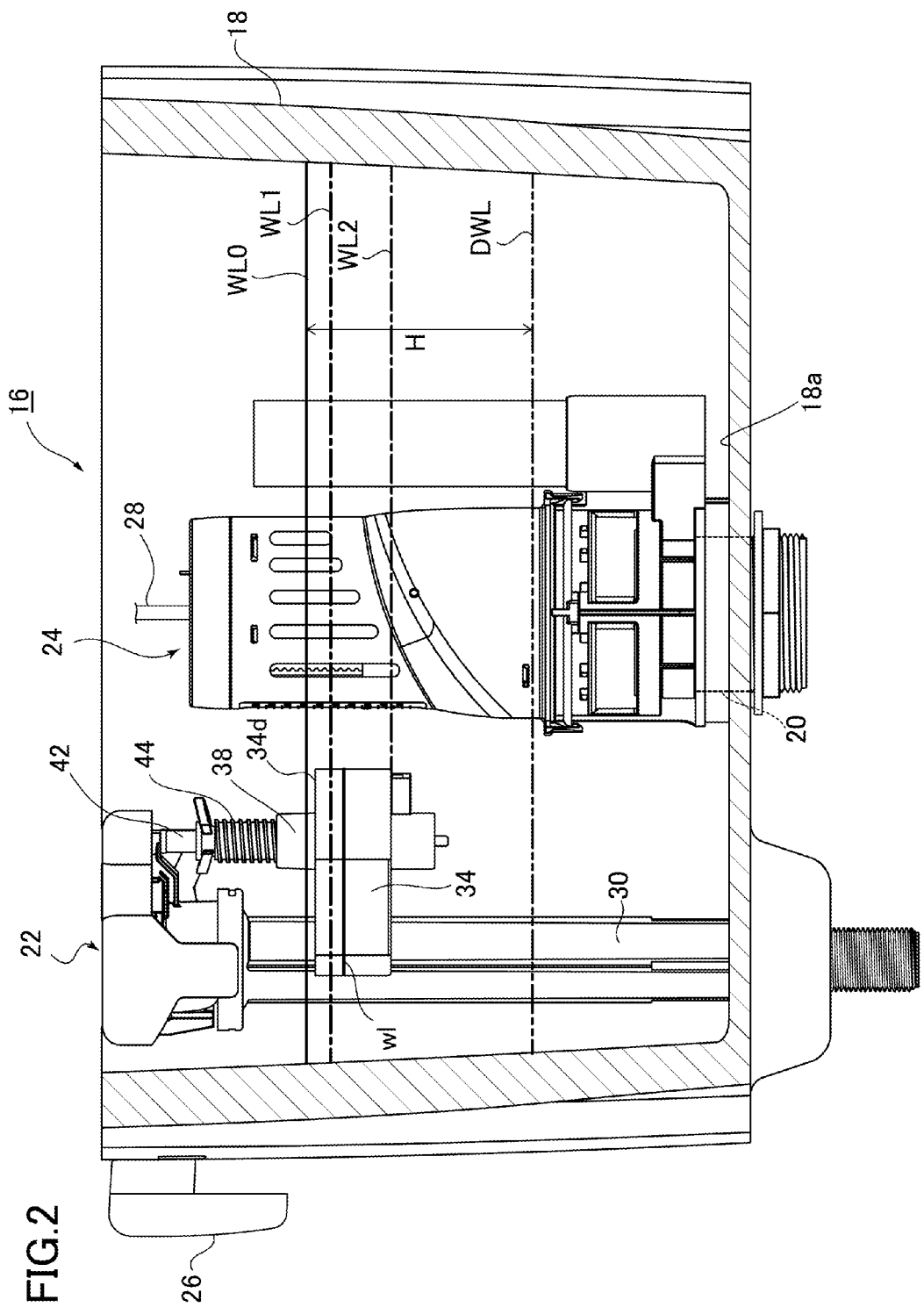
FIG. 2 is a front sectional view illustrating an internal structure of the flush water tank assembly equipped with the flush water supply device according to the first embodiment of the present invention.

FIG. 2 is a front sectional view illustrating the internal structure of the flush water tank assembly equipped with the flush water supply device according to the first embodiment of the present invention. In FIG. 2, a maximum water level, a water-stopping water level and a dead water level within an aftermentioned water storage tank 18 are designated by WL0, WL1 and DWL, respectively. Further, a water level within the water storage tank 18 and a water level within an aftermentioned small tank, causing start of water supply through the flush water supply device 22, are designated by WL2 and wl, respectively.

As illustrated in FIGS. 1 and 2, the flush water tank assembly 16 comprises a water storage tank 18 for storing therein flush water for flushing the flush toilet 1. The water storage tank 18 has a bottom formed with a discharge port 20 which is communicated with the water conduit (not illustrated) of the toilet main unit 2 in such a manner as to allow flush water in the water storage tank 18 to be supplied to the water conduit (not illustrated) of the toilet main unit 2. It is to be understood that an amount of flush water to be stored in the water storage tank 18 varies depending types of toilets.

As illustrated in FIG. 2, the flush water tank assembly 16 further comprises a flush water supply device 22 and a water discharge valve device 24 each provided inside the water storage tank 18, wherein the flush water supply device 22 is designed to supply flush water into the water storage tank 18, and the water discharge valve device 24 is designed to open the discharge port 20 so as to cause flush water stored in the water storage tank 18 to flow into the water conduit (not illustrated) of the toilet main unit 2.

The water discharge valve device 24 has the same configuration as that of a conventional water discharge valve device. Specifically, although not described in detail, the water discharge valve device 24 is configured such that, when a manual operation lever 26 attached to an outer side of the water storage tank 18 is manually turned in a direction for causing a given flushing mode (a large flushing mode or a small flushing mode) to be performed, a valve element (not illustrated) thereof is pulled upwardly by a control wire 28 interlockingly coupled to the manual operation lever 26, and thereby the discharge port 20 is opened for a given period of time to allow a certain amount of flush water in the water storage tank 18 to be discharged to the water conduit (not illustrated) of the toilet main unit 2.

Thirdly, with reference to FIGS. 2 to 13, details of the flush water supply device according to the first embodiment of the present invention will be described below.

Figure 3:
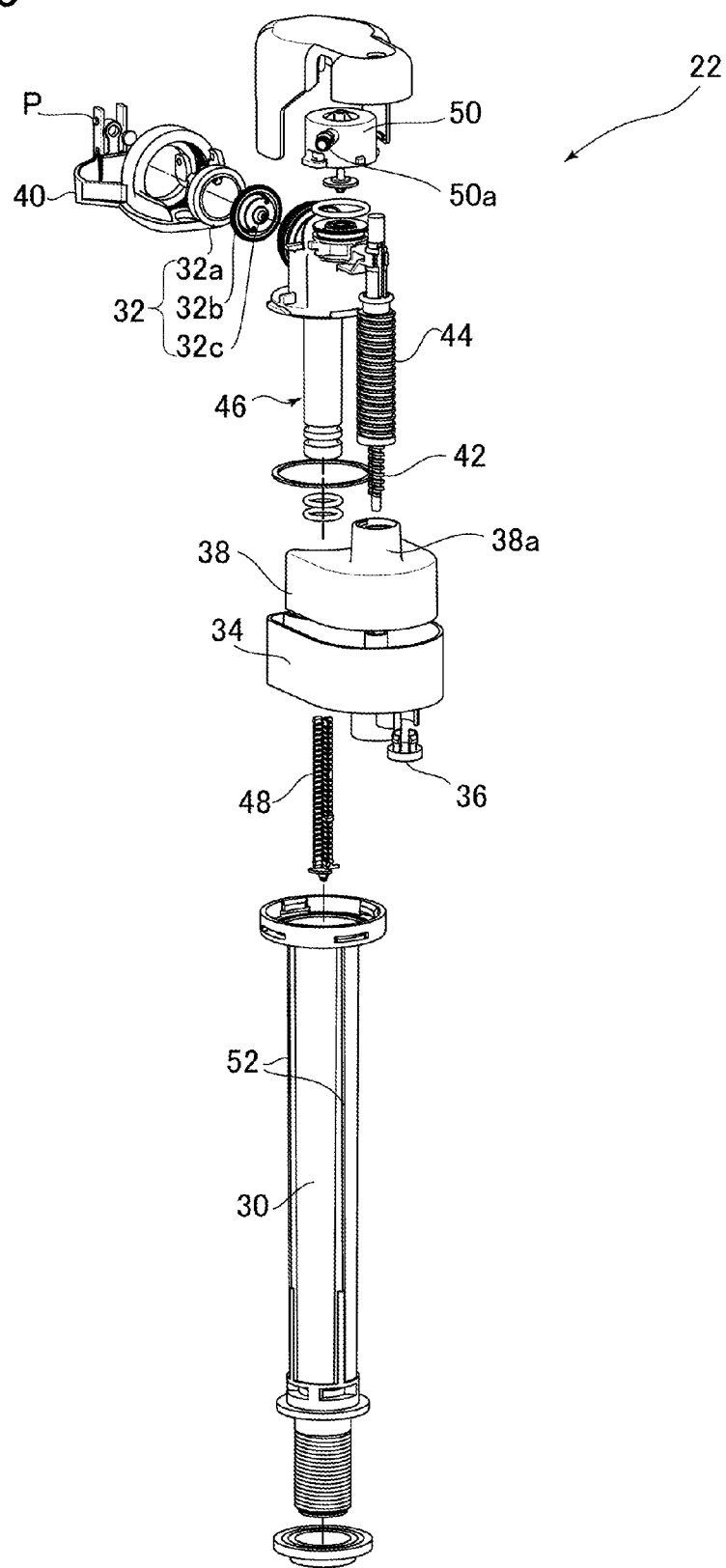
FIG. 3 is an exploded perspective view illustrating the flush water supply device according to the first embodiment of the present invention.
Figure 4:
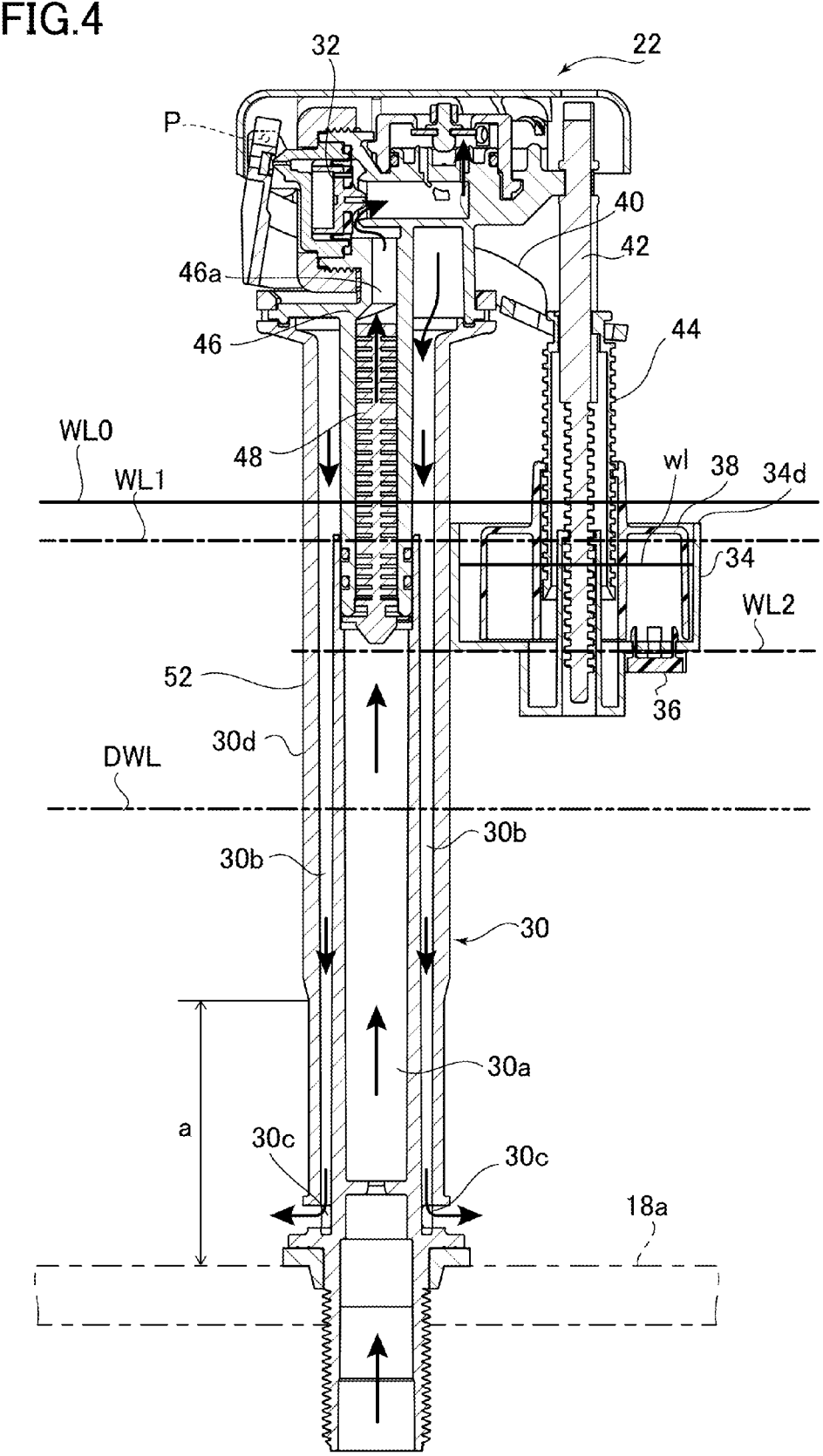
FIG. 4 is a front sectional view illustrating the flush water supply device according to the first embodiment of the present invention.

FIG. 3 is an exploded perspective view illustrating the flush water supply device according to the first embodiment of the present invention, and FIG. 4 is a front sectional view illustrating the flush water supply device according to the first embodiment of the present invention. In FIG. 4, the maximum water level, the water-stopping water level and the dead water level within the water storage tank 18 are designated by WL0, WL1 and DWL, respectively. Further, the water level within the water storage tank 18 and the water level within the aftermentioned small tank, causing start of water supply through the flush water supply device 22, are designated by WL2 and wl, respectively.

Figure 5:
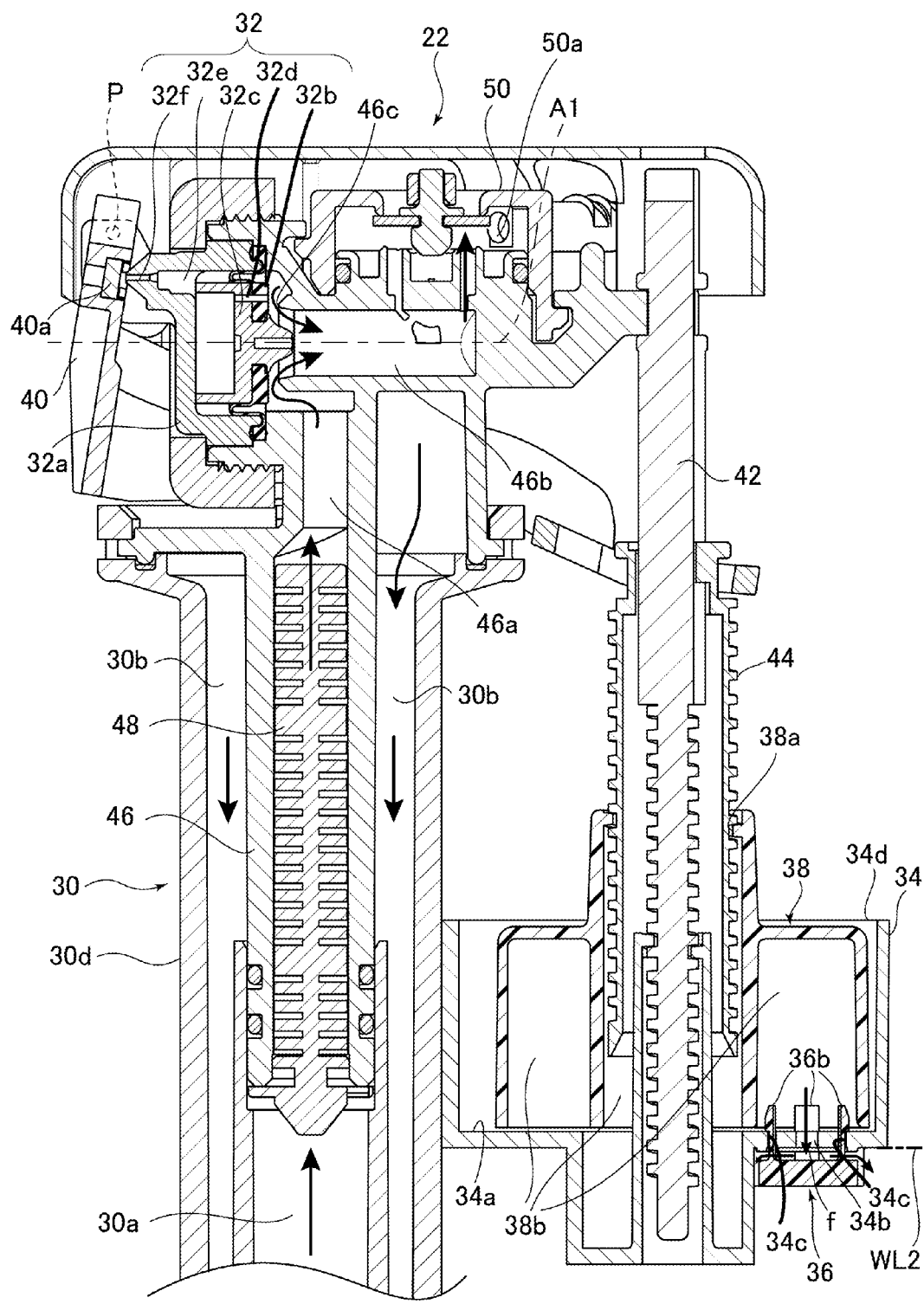
FIG. 5 is a fragmentary enlarged sectional view enlargedly illustrating a part of the flush water supply device according to the first embodiment of the present invention, in a water supplying state (valve open state).
Figure 6:
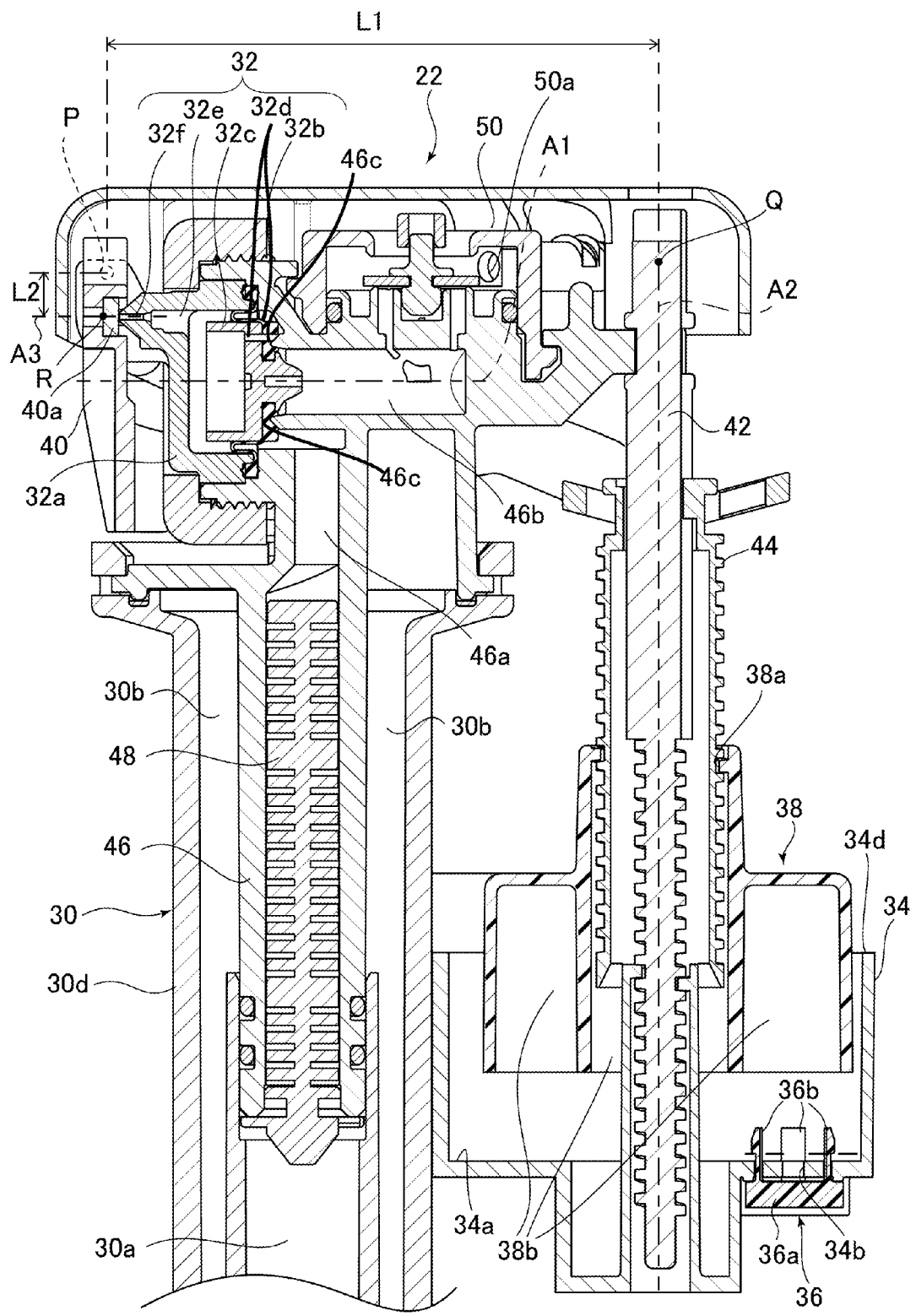
FIG. 6 is a fragmentary enlarged sectional view enlargedly illustrating a part of the flush water supply device according to the first embodiment of the present invention, in a water stopping state (valve closed state).

FIG. 5 is a fragmentary enlarged sectional view enlargedly illustrating a part of the flush water supply device according to the first embodiment of the present invention, in a water supplying state (valve open state), and FIG. 6 is a fragmentary enlarged sectional view enlargedly illustrating a part of the flush water supply device according to the first embodiment of the present invention, in a water stopping state (valve closed state).

In FIG. 4 and FIG. 5, water flows in a primary water supply passage and a secondary water supply passage are indicated by the arrowed lines.

As illustrated in FIGS. 2 to 6, the flush water supply device 22 according to the first embodiment of the present invention comprises a water supply pipe 30 connected to an external water supply source (not illustrated) and extending upwardly from a bottom wall 18a of the water storage tank 18, and a diaphragm-operated water supply valve 32 provided above and in laterally offset relation to the water supply pipe 30 and adapted to switch between a water spouting state and a water stopping state with respect to an inside of the water storage tank 18, in terms of flush water supplied from the water supply pipe 30.

The flush water supply device 22 further comprises: a small tank 34 detachably attached to the water supply pipe 30; a check valve 36 adapted to open and close an opening (not illustrated) formed in a bottom wall of the small tank 34; a float 38 provided inside the small tank 34 and adapted to be moved upwardly and downwardly according to a change in water level within the small tank 34; and a swingable member 40 having one end connected to the float 38 and the other end connected to the water supply valve 32. The swingable member 40 is adapted, according to the upward and downward movements of the float 38, to be swingably moved about a fulcrum (support point) P located adjacent to the water supply valve 32, thereby causing opening and closing of the water supply valve 32. Furthermore, the flush water supply device 22 comprises: a small tank position-adjusting fixed shaft member 42 fixed above and in laterally offset relation to the water supply pipe 30 and capable of adjusting a position of the small tank 34 with respect to the water supply pipe 30 in an up-down direction, and an adjustment shaft member 44 attached to a distal end of the swingable member 40 and the float 38 so as to connect them together and screwed into a mounting hole 38a formed in an approximately central region of the float 38, in a manner capable of adjusting a vertical relative position between the distal end of the swingable member 40 and the float 38.

As illustrated in FIGS. 2 to 4, the water supply pipe 30 is attached to the bottom wall 18a of the water storage tank 18, and connected to an external water supply source (not illustrated), such as a waterworks system, to supply flush water into the water storage tank 18. The water supply pipe 30 has a primary water supply passage 30a formed in a central region thereof to extend in an up-down direction, a secondary water supply passage 30b formed thereinside and outward of the primary water supply passage 30a, and an outlet port 30c formed at a lower end of the secondary water supply passage 30b to allow flush water to be supplied into the water storage tank 18 therethrough.

As illustrated in FIGS. 3 and 4, a water supply passage-forming member 46 having an internal passage forming a water supply passage is provided at an upper end of the water supply pipe 30. The water supply passage-forming member 46 has a primary water supply passage 46a formed in a central region of a portion thereof inserted into the water supply pipe 30 to extend in the up-down direction, and connected to the primary water supply passage 30a of the water supply pipe 30.

Further, a filter member 48 is installed inside the primary water supply passage 46a of the water supply passage-forming member 46 to subject water to filtering.

As illustrated in FIGS. 4 to 6, the water supply passage-forming member 46 has a secondary water supply passage 46b formed inside a portion thereof located above the water supply pipe 30 to have a central axis A1 extending in a horizontal direction and a downstream end communicated with the secondary water supply passage 30b of the water supply pipe 30.

The diaphragm-operated water supply valve 32 is provided to be interposed between the primary water supply passage 46a and the secondary water supply passage 46b of the water supply passage-forming member 46 extending in the up-down direction and in the horizontal direction, respectively.

As illustrated in FIGS. 5 and 6, the water supply valve 32 comprises: a valve housing 32a having a central axis aligned with the central axis A1 extending in the horizontal direction; a diaphragm 32b attached to the valve housing 32a concentrically with respect to the central axis A1 and adapted to be displaceable along the central axis A1 in a right-left direction (in FIGS. 5 and 6); and a valve element 32c attached to the diaphragm 32b and adapted to be displaceable in the right-left direction in FIGS. 5 and 6 integrally together with the diaphragm 32b.

The diaphragm 32b is formed with a bleed hole 32d extending parallel to the central axis A1. Through the bleed hole 32d, the primary water supply passage 46a of the water supply passage-forming member 46 and a back pressure chamber 32e located on a lateral side with respect to the diaphragm 32b are communicated with each other. A portion of the valve housing 32a located laterally beside the back pressure chamber 32e is formed with a pilot hole 32f.

As illustrated in FIGS. 5 and 6, the swingable member 40 is attached to a lateral side of the valve housing 32a of the water supply valve 32, swingably about the fulcrum P located at an end of the valve housing 32a. The swingable member 40 comprises a valve member 40a for opening and closing the pilot hole 32f of the water supply valve 32 according to the swinging movement. Specifically, the valve member 40a of the swingable member 40 is adapted to open and close the pilot hole 32f of the water supply valve 32, thereby making it possible to switch between the water supplying state and the water stopping state according to the water supply valve 32.

FIG. 5 illustrates a state (water supplying state) in which, when a water level within the small tank 34 becomes approximately zero, the float 38 is moved downwardly to a lowermost position to cause the swingable member 40 to be swingingly moved downwardly about the fulcrum P, so that the valve member 40a is moved to open the pilot hole 32f of the water supply valve 32, and thereby the valve element 32c is displaced leftwardly (in FIG. 5) to open a valve seat 46c of the water supply passage-forming member 46 located at an upstream end of the secondary water supply passage 46b.

On the other hand, FIG. 6 illustrates a state (water stopping state) in which the float 38 is moved upwardly to an uppermost position to cause the swingable member 40 to be swingingly moved upwardly about the fulcrum P, so that the valve member 40a is moved to close the pilot hole 32f of the water supply valve 32, and thereby the valve element 32c is displaced rightwardly (in FIG. 5) to close the valve seat 46c of the water supply passage-forming member 46 located at the upstream end of the secondary water supply passage 46b.

As illustrated in FIG. 6, a ratio of a shortest distance L1 between the fulcrum P of the swingable member 40 and a vertical center line A2 of the float 38 (a distance between the fulcrum P and an effort point Q) to a shortest distance L2 between the fulcrum P of the swingable member 40 and a center line A3 of the pilot hole 32f (a distance between the fulcrum P and a load point R) is set to a given value or more (e.g., 13.0 or more), preferably, in the range of 15.0 to 20.0, more preferably, in the range of 15.2 to 16.0.

In the first embodiment, the valve element 32c of the water supply valve 32 is installed openably and closeably in a horizontal direction (in FIG. 6) with respect to the valve seat 46c of the water supply passage-forming member 46 opened in the horizontal direction, and disposed laterally beside the water supply passage-forming member 46 located above the water supply pipe 30. Thus, even in a situation where, in order to save an amount of flush water to be used for flushing of the toilet main unit 2, a height difference H between the maximum water level WL0 and the dead water level DWL within the water storage tank 18 is set to a relatively small value, as illustrated in FIG. 2, and the small tank 34 is formed in a flattened shape in which a maximum vertical length h becomes less than a maximum horizontal (longitudinal) length l by a given value, as described in detail later with reference to FIG. 10, so that it becomes impossible to ensure a sufficient water level within the small tank 34 after completion of water supply from the water supply pipe 30 to the water storage tank 18, causing difficulty in obtaining buoyancy enough to move the float 38 upwardly at the water level wl (hereinafter referred to as "water supply starting water level wl") within the small tank 34 illustrated in FIGS. 2 and 4, it becomes possible to sufficiently ensure the shortest distance L1 between the fulcrum P of the swingable member 40 and the vertical center line A2 of the float 38, and set the lever ratio L1/L2 to a given value or more.

That is, even in a situation where, when the water level within the small tank 34 is raised, the buoyancy causing the upward movement of the float 38 is relatively small, i.e., an upward force acting on the float 38 (effort point) is relatively small, it becomes possible to easily swingingly move the swingable member 40 about the fulcrum P, and quickly open the water supply valve 32.

As illustrated in FIGS. 3, 5 and 6, a supplementary water housing 50 is provided above the secondary water supply passage 46b of the water supply passage-forming member 46 extending in the horizontal direction. The supplementary water housing 50 has a lateral wall formed with a supplementary water supply passage 50a for separating a part of water flowing from the secondary water supply passage 46b of the water supply passage-forming member 46 into the housing 50, as supplementary water, and supplying the supplementary water into the water storage tank 18.

Next, with reference to FIGS. 3 and 5 to 10, the small tank 34 and the float 38 will be described in more detail below.

Figure 7:
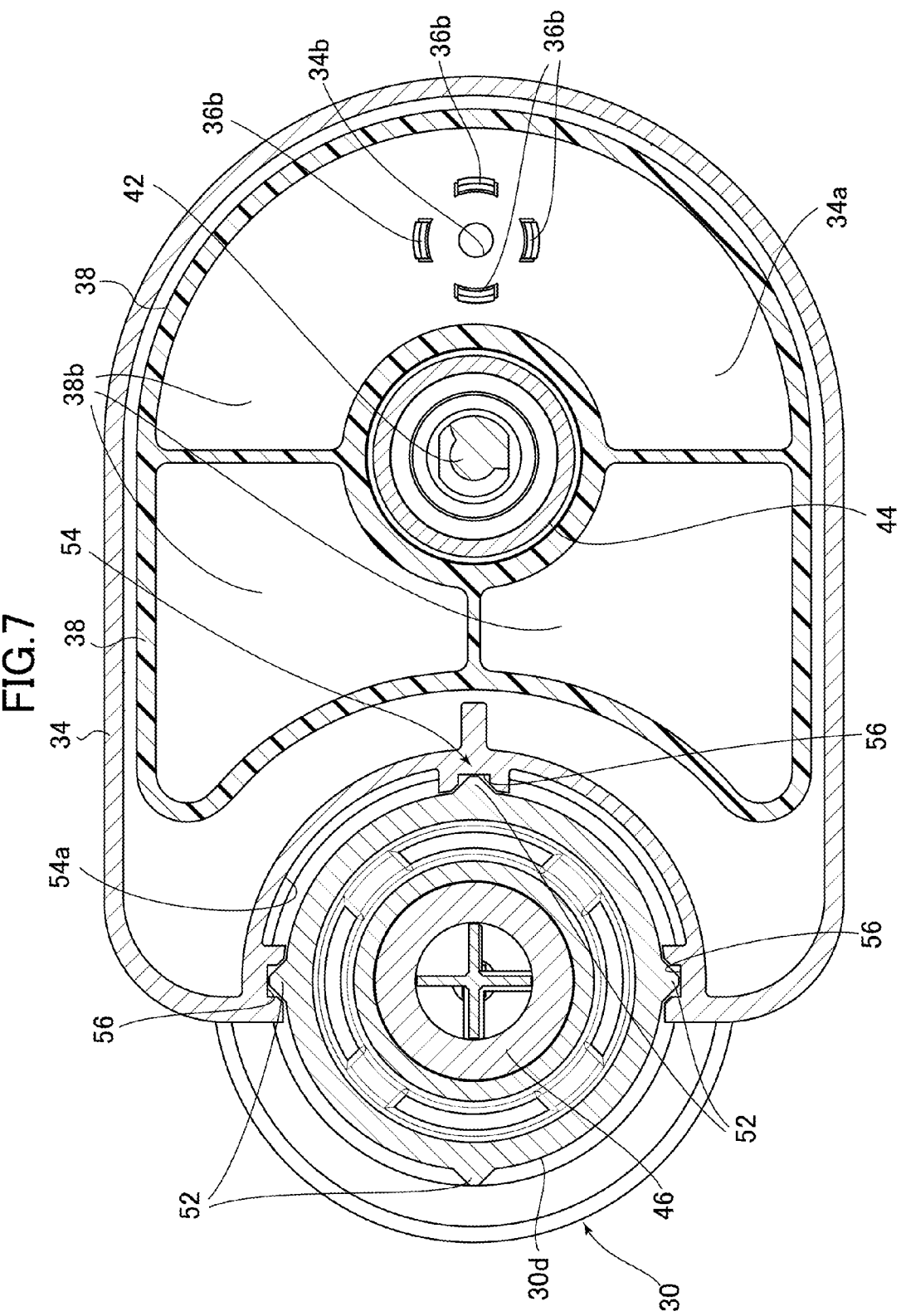
FIG. 7 is a top plan sectional view illustrating a water supply pipe, a small tank and a float of the flush water supply device according to the first embodiment of the present invention.
Figure 8:
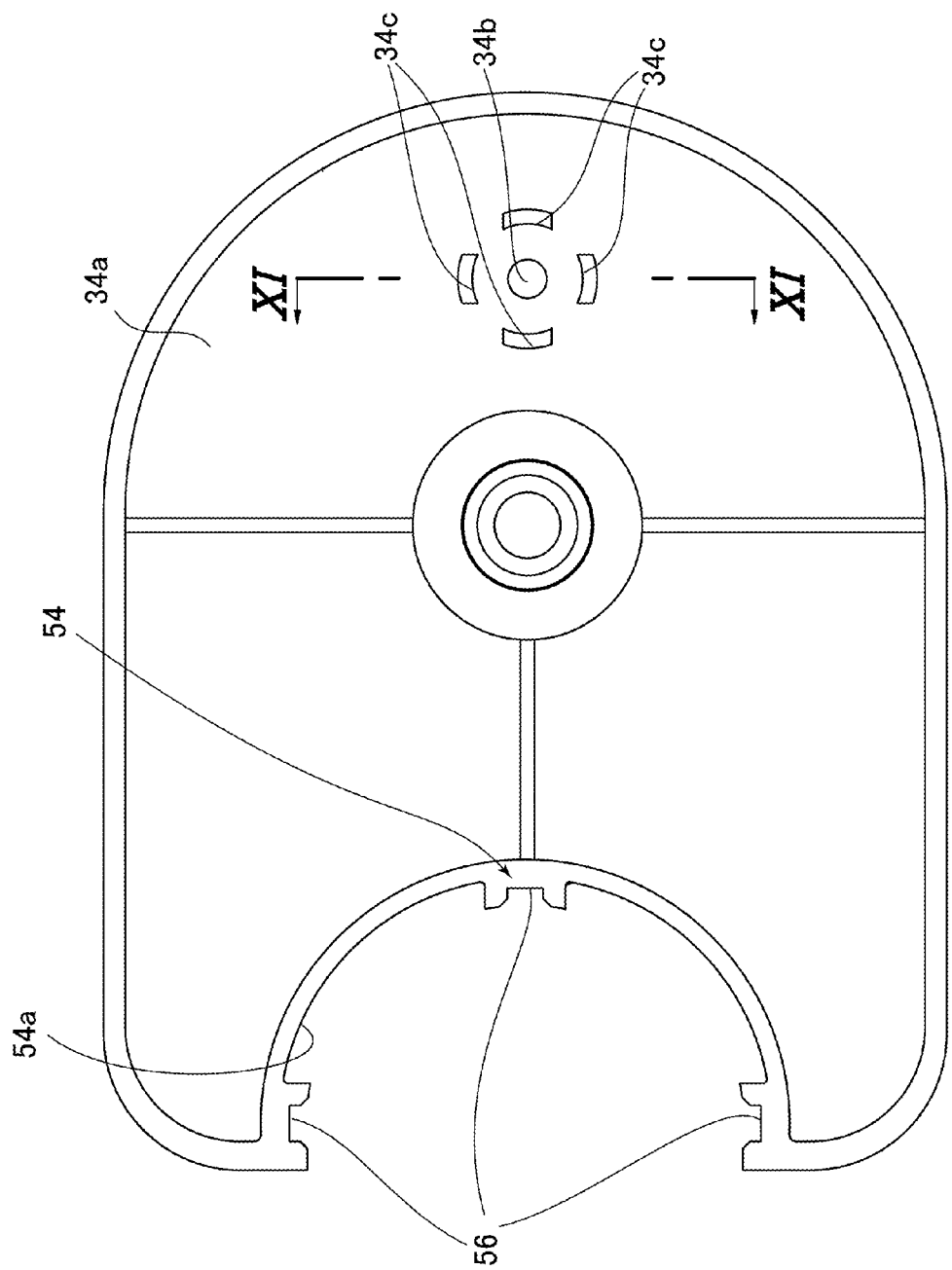
FIG. 8 is a top plan view illustrating the small tank of the flush water supply device according to the first embodiment of the present invention.
Figure 9:
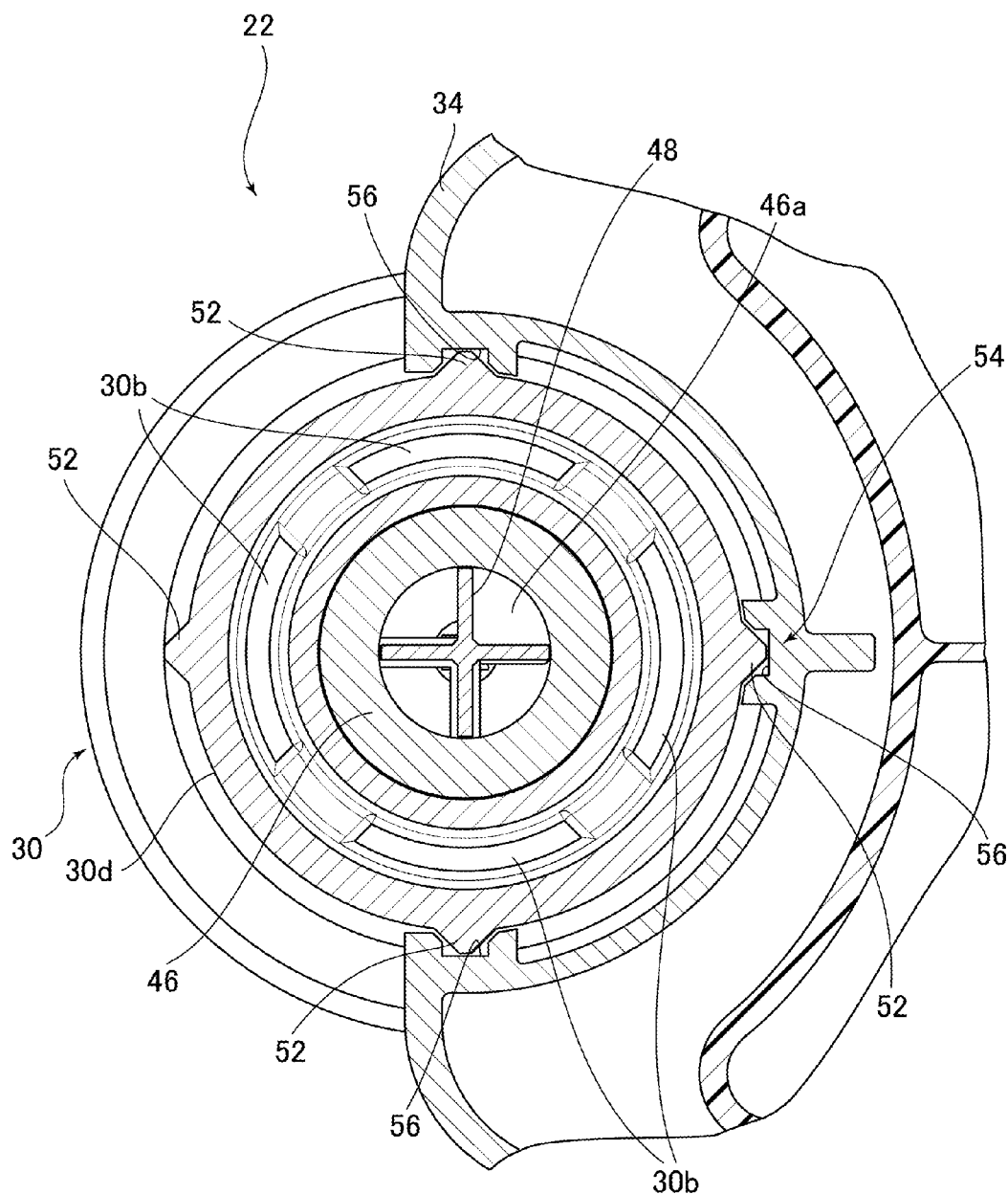
FIG. 9 is a fragmentary enlarged sectional view enlargedly illustrating a fitting region between the water supply pipe and the small tank in the flush water supply device according to the first embodiment of the present invention.

FIG. 7, FIG. 8 and FIG. 9 are, respectively, a top plan sectional view illustrating the water supply pipe, the small tank and the float of the flush water supply device according to the first embodiment of the present invention, a top plan view illustrating the small tank of the flush water supply device according to the first embodiment of the present invention, and a fragmentary enlarged sectional view enlargedly illustrating a fitting region between the water supply pipe and the small tank in the flush water supply device according to the first embodiment of the present invention.

As illustrated in FIGS. 2 to 8, the small tank 34 are adapted to be detachably attached to a lateral side of the water supply pipe 30 fixedly attached to the water storage tank 18. In this case, a plurality of types of small tanks each having a different capacity to receive therein flush water may be prepared, so that one of the small tanks 34 can be appropriately replaced with another one suitable for on an amount of flush water in the water storage tank 18 to be used for toilet flushing.

As illustrated in FIGS. 3, 4, 7 and 9, the water supply pipe 30 has four convex portions 52 integrally formed on a lateral surface 30d thereof at even intervals to protrude outwardly. Each of the convex portions 52 is formed to extend from a position of the water supply pipe 30 upwardly away from the bottom wall 18a of the water storage tank 18 by a given heightwise distance a (see FIG. 4), to the upper end of the water supply pipe 30, in the up-down direction.

On the other hand, as illustrated in FIGS. 7 to 9, the small tank 34 has a fitting portion 54 formed to be fittingly engageable with the convex portions 52 on the lateral surface 30d of the water supply pipe 30. The fitting portion 54 is formed in a generally half-cylindrical shape having a generally C-shaped surface 54a (in top plan view in FIG. 8) capable of surrounding an approximately one-half region of the lateral surface 30d of the water supply pipe 30 when the small tank 34 is attached to the lateral surface 30d of the water supply pipe 30. The C-shaped surface 54a of the fitting portion 54 of the small tank 34 has three recesses 56 each formed in a convex shape fittingly engageable with a respective one of three of the convex portions 52 on the lateral surface 30d of the water supply pipe 30 to extend in the up-down direction, at a position opposed to the convex portion 52.

An operation for attaching the small tank 34 to the water supply pipe 30 is performed as follows. In a zone of the water supply pipe 30 located below lower ends of the convex portions 52, i.e., devoid of the convex portions 52 (in FIG. 4, a zone of the water supply pipe 30 below the position upwardly away from the bottom wall 18a of the water storage tank 18 by the given heightwise distance a), the fitting portion 54 of the small tank 34 is conformably brought into contact with the water supply pipe 30 to surround approximately one-half of an outer periphery of the water supply pipe 30, and each of the recesses 56 of the small tank 34 is positioned just below a respective one of the convex portions of the water supply pipe 30. Then, in this state, the small tank 34 is moved upwardly, so that each of the convex portions 52 of the water supply pipe 30 is fittingly engaged with a respective one of the recesses 56 in the fitting portion 54 of the small tank 34. In this manner, the small tank 34 is attached to the water supply pipe 30.

Figure 10:
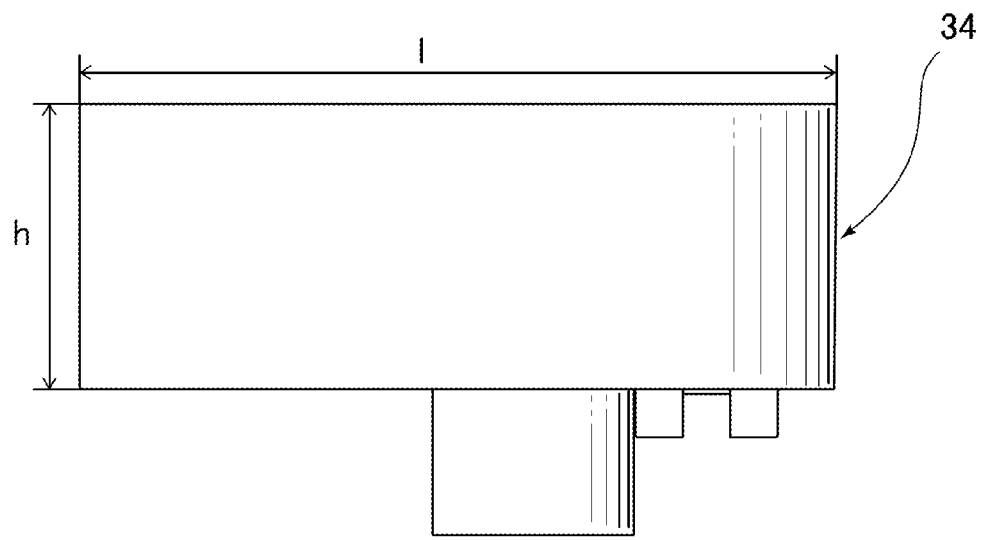
FIG. 10 is a front view illustrating the small tank of the flush water supply device according to the first embodiment of the present invention.

FIG. 10 is a front view illustrating the small tank of the flush water supply device according to the first embodiment of the present invention.

As illustrated in FIG. 10, the small tank 34 is formed in a generally horizontally-long flattened shape in which a maximum vertical length h becomes less than a maximum horizontal (longitudinal) length l by a given value. A ratio of the maximum vertical length h to the maximum horizontal (longitudinal) length l of the small tank 34 (hereinafter referred to as "vertical to horizontal ratio h/l") is set, preferably, in the range of 1/2.25 to 1/2.28. In this case, even in the situation where, in order to save an amount of flush water to be used for flushing of the toilet main unit 2, a height difference H between the maximum water level WL0 and the dead water level DWL within the water storage tank 18 is set to a relatively small value, as illustrated in FIG. 2, it becomes possible to stabilize upward and downward movements of the float 38 according to a height difference in water level within the small tank 34, as compared to a small tank having a generally vertically-long flattened shape in which a maximum vertical length h becomes greater than a maximum horizontal (longitudinal) length l by a given value, or a small tank having a non-flattened shape such as a cubic shape.

As illustrated in FIGS. 3 to 7, the float 38 is made of a resin material, and formed to have an outer peripheral shape approximately conforming to an internal shape of the small tank 34 in a manner capable of being received inside the small tank 34.

Further, as illustrated in FIGS. 5 and 6, the float 38 has a shape opened only downwardly, and internally has a buoyancy producing portion 38*b* for producing buoyancy based on flush water in the small tank 34.

If a vertical height dimension of the small tank 34 is simply set to a small value, so as to allow the small tank 34 to be formed in a flattened shape in which a maximum vertical length h becomes less than a maximum horizontal (longitudinal) length l by a given value, a height of the water level within the small tank 34 becomes relatively low, thereby causing difficulty in sufficiently obtaining buoyancy of the float 38. In this regard, particularly in the first embodiment, the float 38 is formed to have an outer peripheral shape approximately conforming to the internal shape of the small tank 34, thereby making it possible to increase a pressure-receiving surface area of the buoyancy producing portion 38*b* of the float 38 to increase the buoyancy.

Next, with reference to FIGS. 5 to 7, FIG. 8 and FIGS. 11 to 13, details of the check valve 36 will be described.

Figure 11:
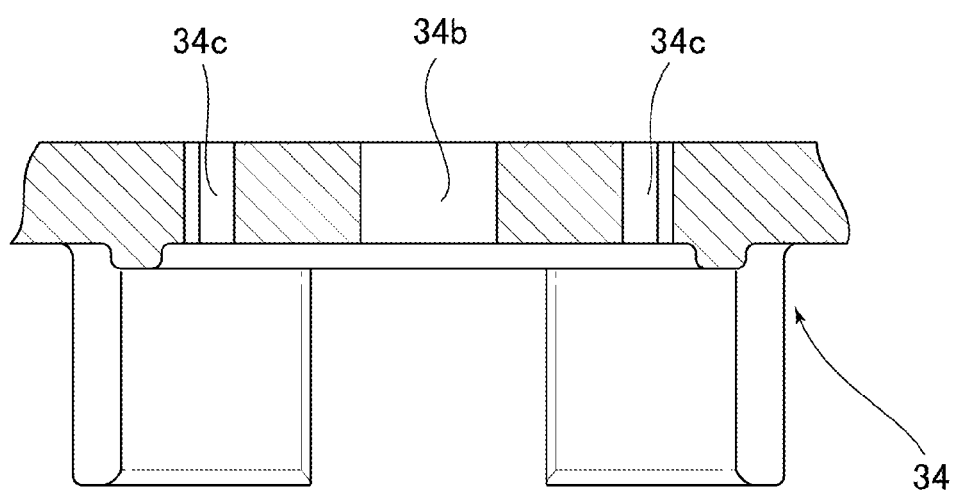
FIG. 11 is a sectional view taken along the line XI-XI in FIG. 8.
Figure 12:
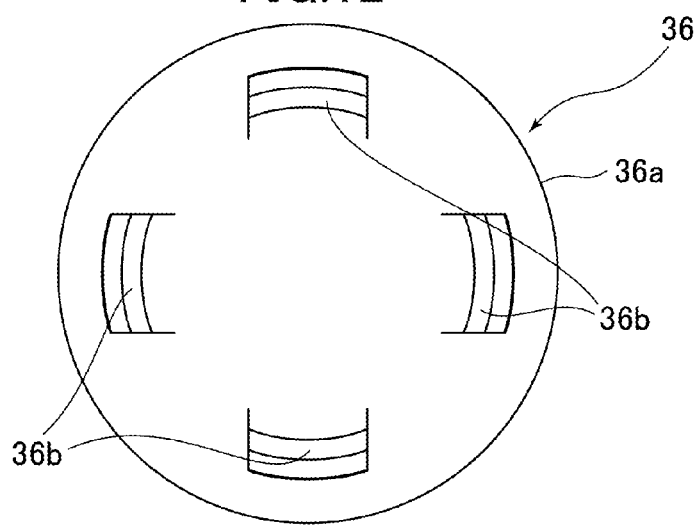
FIG. 12 is a top plan view illustrating a check valve of the flush water supply device according to the first embodiment of the present invention.

FIG. 11 is a sectional view taken along the line XI-XI in FIG. 8. FIG. 12 is a top plan view illustrating the check valve of the flush water supply device according to the first embodiment of the present invention, and FIG. 13 is a front sectional view illustrating the check valve of the flush water supply device according to the first embodiment of the present invention.

The bottom wall 34*a* of the small tank 34 has a small hole 34*b* formed to penetrate therethrough in an up-down direction, and four mounting holes 34*c* formed to penetrate therethrough in the up-down direction, at respective positions spaced apart from the small hole 34*b* in its radial direction by a given distance and at even intervals in a circumferential direction of the small hole 34*b*, so as to allow the check valve 36 to be attached thereto.

Figure 13:
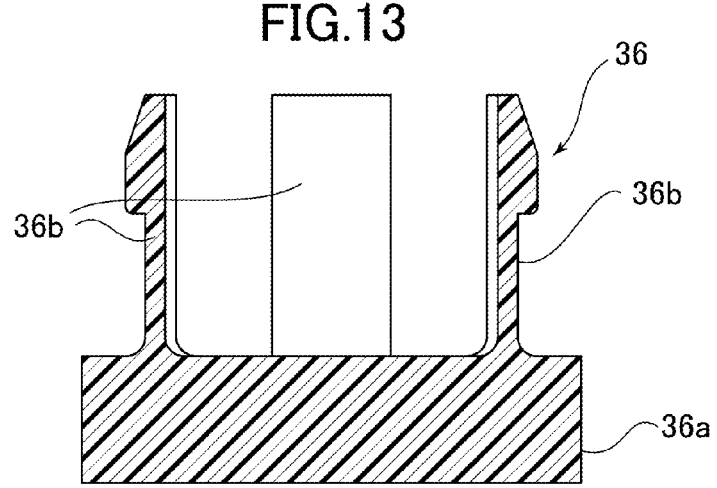
FIG. 13 is a front sectional view illustrating the check valve of the flush water supply device according to the first embodiment of the present invention.

As illustrated in FIGS. 12 and 13, the check valve 36 is made of a material having a specific gravity less than that of water, so as to become capable of being moved upwardly and downwardly depending on the flush water level within the water storage tank 18, and attached to the bottom wall of the small tank 34 from therebelow in such a manner that it can be moved upwardly and downwardly by means of buoyancy, according to a flush water level within the water storage tank 18, thereby opening and closing the small hole 34*b* of the small tank 34.

More specifically, the check valve 36 has a generally disk-shaped valve section 36*a* for opening and closing the small hole 34*b* of the small tank 34, and four support sections 36*b* each formed to extend upwardly from an upper surface of the valve section 36*a* and adapted to be inserted into and attached to a respective one of the mounting holes 34*c* of the small tank 34. Then, when each of the support sections 36*b* is attached to a corresponding one of the mounting holes 34*c* of the small tank 34, the support section 36*b* becomes capable of being slidingly moved in the up-down direction with respect to the corresponding mounting hole 34*c* of the small tank 34, according to the upward and downward movements of the check valve 36. Further, the support sections 36*b* is formed such that, in the attached state, a distal end (upper end) thereof protrudes externally, i.e., is located outward of the corresponding mounting hole 34*c* of the small tank 34. More specifically, the support section 36*b* is formed such that, even when the check valve 36 is moved downwardly to a lowermost position with respect to the small tank 34, the distal end thereof is brought into contact with the bottom wall 34*a* of the small tank 34 to prevent drop-off of the check valve 36.

Furthermore, when the check valve 36 is moved downwardly as illustrated in FIG. 5, flush water in the small tank 34 can be quickly drained from the small hole 34*b* and the mounting holes 34*c* of the small tank 34. Thus, as compared to cases where the bottom wall 34*a* of the small chamber 34 is not formed with the small hole 34*b*, it becomes possible to reduce a movement distance of the check valve 36 required for opening the small hole 34*b* and the mounting holes 34*c*, and stably drain flush water in the small tank 34 only by a slight downward movement of the check valve 36.

Further, the check valve 36 itself of the flush water supply device 22 according to the first embodiment is made of a material having a specific gravity less than that of water (e.g., a resin material), so that it becomes possible to stably move the check valve 36 upwardly and downwardly according to the flush water level within the water storage tank 18, thereby stably closing and opening the small hole 34*b* of the small tank 34. Then, by using the above material, the check valve 36 is formed as a solid structure. This makes it possible to eliminate a need for an air holding space for producing the buoyancy causing the upward movement of the check valve 36, thereby suppressing an increase in size of the check valve 36 in the up-down direction.

On the other hand, when the water level within the water storage tank 18 is raised, the check valve 36 can quickly close the small hole 34*b* of the small tank 34 by means of buoyancy, according to the water level within the water storage tank 18, as illustrated in FIG. 6. Thus, just before the water level within the water storage tank 18 is raised beyond an upper edge 34*d* of the small tank 34 to cause flush water to flow into the small tank 34, an inside of the small tank 34 can be kept vacant to allow the float 38 to be kept at its lowermost position. Then, when flush water flows into the small tank 34 beyond the upper edge 34*d* of the small tank 34, the float 38 can be quickly moved upwardly to promptly set the water supply valve 32 to the water stopping state.

Next, with reference to FIGS. 1 to 13, operations (functions) of the flush water supply device according to the first embodiment, the flush water tank assembly equipped with the flush water supply device, and the flush toilet equipped with the flush water tank assembly, will be described.

In two types of flushing modes: a full flushing mode and a partial flushing mode, to be performed by the flush water tank assembly equipped with the water discharge valve device in the first embodiment, fundamental operations during the full flushing mode and during the partial flushing mode are the same, except that: a time period of an open state of the discharge port 20 of the water storage tank 18 during the full flushing mode is greater than that during the partial flushing mode, because a pull-up amount of the valve element (not illustrated) of the water discharge valve device 24 by the control wire 28 during the full flushing mode is greater than that during the partial flushing mode; and the dead water level DWL during the full flushing mode is lower than that during the partial flushing mode. Thus, the following description will be made about only operations during the full flushing mode.

As illustrated in FIGS. 2, 4 and 6, in a state just before start of water discharge by the water discharge valve device 24, the valve element (not illustrated) of the water discharge valve device 24 closes up the discharge port 20, so that an initial water level within the water storage tank 18 becomes equal to the maximum water level WL0 (FIG. 2), and the float 38 is located under flush water.

Then, as illustrated in FIGS. 2, 4 and 6, when a user manually moves the manual operation lever 26, the water discharge valve device 24 operates to open the discharge port 20 of the water storage tank 18 to start water discharge from the flush water tank assembly 16 to the toilet main unit 2 of the flush toilet 1, in the full flushing mode, so that the water level within the water storage tank 18 starts being lowered. In this process, the float 38 is moved upwardly by means of buoyancy based on flush water in the small tank 34, and then maintained in a stationary state at its uppermost position.

Then, as illustrated in FIGS. 2, 4 and 6, when the water level within the water storage tank 18 is lowered with respect to the maximum water level WL0, but the water level within the water storage tank 18 and the water level within the small tank 34 are higher than respective ones of the water level WL2 and the water level wl causing start of water supply through the flush water supply device 22, the float 38 is still maintained in a stationary state at the uppermost position, so that water supply through the flush water supply device 22 is not performed even when the water level within the water storage tank 18 is lowered to the water-stopping water level WL1.

Then, as illustrated in FIGS. 2, 4 and 6, when the water level within the water storage tank 18 becomes lower than the water level WL2 which is approximately equal to a height position of the bottom wall 34*a* of the small tank 34, the buoyancy acting on the check valve 36 based on flush water in the water storage tank 18 is less than a self-weight of the check valve 36, so that the check valve 36 is moved downwardly to open the small hole 34*b* and the mounting hole 34*c* of the bottom wall 34*a* of the small tank 34.

Thus, as indicated by the flow f in FIG. 5, flush water in the small tank 34 is drained from gaps with respect to the small hole 34*b* and the mounting holes 34*c* of the bottom wall 34*a* of the small tank 34, and the water level within the small tank 34 starts being lowered from its maximum water level equal to a height position of the upper edge 34*d* of the small tank 34. In this process, before the water level within the small tank 34 is lowered to the water supply starting water level wl, the buoyancy acting on the buoyancy producing portion 38*b* of the float 38 is greater than a self-weight of the float 38, so that the float 38 is still maintained in a stationary state at the uppermost position. In the first embodiment, the water supply starting water level wl within the small tank 34 is set to be higher than the water supply starting water level WL2 within the water storage tank 18.

On the other hand, when the water level within the small tank 34 is lowered beyond the water supply starting water level wl, the buoyancy acting on the buoyancy producing portion 38*b* of the float 38 becomes less than the self-weight of the float 38, so that the float 38 is moved downwardly. Then, as illustrated in FIGS. 4 and 5, according to the downward movement of the float 38, the swingable member 40 is swingingly moved about the fulcrum P, and the valve member 40*a* of the swingable member 40 is moved to open the pilot hole 32*f* of the water supply valve 32, so that the valve element 32*c* is moved leftwardly (in FIG. 5) to establish a state in which the valve seat 46*c* of the water supply passage-forming member 46 located at the upstream end of the secondary water supply passage 46*b* is opened (water supplying state). In this state, flush water is supplied from the outlet port 30*c* of the secondary water supply passage 30*b* of the water supply pipe 30.

Then, as illustrated in FIGS. 2, 4 and 5, when the water level within the water storage tank 18 is lowered to the dead water level DWL, the water discharge valve device 24 operates to close the discharge port 20 of the water storage tank 18. During the above process, the water level within the small tank 34 becomes zero, so that the water supply valve 32 is kept opened to allow the water supply to the water storage tank 18 to be continuously performed through the flush water supply device 22. Thus, the water level within the water storage tank 18 is gradually raised from the dead water level DWL.

Then, when the water level within the water storage tank 18 is raised to the water level WL2, the check valve 36 is moved upwardly to close the small hole 34*b* and the mounting holes 34*c* of the small tank 34.

At this timing, the water level within the small tank 34 is still kept zero. However, when the water level within the water storage tank 18 is further raised to cause flush water to flow into the small tank 34 beyond the upper edge 34*d* of the small tank 34, the water level within the small tank 34 is rapidly raised, so that the float 38 is quickly moved upwardly to promptly set the water supply valve 32 to the water stopping state.

In the flush water supply device 22 according to the first embodiment of the present invention, even in the situation where, in order to save an amount of flush water to be used for flushing of the flush toilet 1, a height difference H between the water-stopping water level WL1 and the dead water level DWL within the water storage tank 18 is set to a relatively small value, it becomes possible to stabilize upward and downward movements of the float 38 according to a height difference in water level within the small tank 34, as compared to a small tank having a generally vertically-long flattened shape in which a maximum vertical length h becomes greater than a maximum horizontal (longitudinal) length l by a given value, or a small tank having a non-flattened shape such as a cubic shape. Thus, it becomes possible to stably drain flush water in the small tank 34, so that the flush water supply device 22 can ensure reliability.

Further, the valve element 32*c* of the water supply valve 32 is installed openably and closably in a horizontal direction (in FIG. 6) with respect to the valve seat 46*c* of the water supply passage-forming member 46 opened in the horizontal direction, and provided above the water supply pipe 30 and laterally beside the water supply passage-forming member 46. Thus, even in a situation where the small tank 34 is formed in a generally horizontally-long flattened shape, so that it becomes impossible to ensure a sufficient water level within the small tank 34 after completion of water supply from the water supply pipe 30 to the water storage tank 18, causing difficulty in obtaining buoyancy enough to move the float 38 upwardly depending on the water level within the small tank 34, it becomes possible to sufficiently ensure a distance L1 between the fulcrum P adjacent to the water supply valve 32 and the effort point Q defined by the swingable member 40 and the float 38. That is, a ratio (lever ratio L1/L2) of the distance (L1), to a distance (L2) between the fulcrum P adjacent to the water supply valve 32 and a load point R defined by the swingable member 40 and the water supply valve 32 can be set to a given value or more. Therefore, even in a situation where the buoyancy causing the upward movement of the float 38 according to the water level within the small tank 34 is relatively small, and a force acting on a connection point (effort point) defined by the swingable member 40 and the float 38 is relatively small, it becomes possible to facilitate the swinging movement of the swingable member 40 about the fulcrum P adjacent to the water supply valve 32, thereby promptly opening the water supply valve 32. In addition, the height difference H between the water-stopping water level WL1 and the dead water level DWL within the water storage tank 18 can be set to a smaller value, so that an amount of flush water to be used for flushing of the flush toilet 1 can be set to a smaller value.

In the flush water supply device 22 according to the first embodiment, the check valve 36 itself is made of a material having a specific gravity less than that of water (e.g., a resin material), so that it becomes possible to stably move the check valve 36 upwardly and downwardly according to the flush water level within the water storage tank 18, thereby stably closing and opening the small hole 34b of the small tank 34. Then, by using the above material, the check valve 36 is formed as a solid structure. This makes it possible to eliminate a need for an air holding space for producing the buoyancy causing the upward movement of the check valve 36, thereby suppressing an increase in size of the check valve 36 in the up-down direction. On the other hand, when the water level within the water storage tank 18 is raised, the check valve 36 can quickly close the small hole 34b and the mounting holes 34c of the small tank 34 by means of buoyancy. Thus, just before the water level within the water storage tank 18 is raised beyond the upper edge 34d of the small tank 34 to cause flush water to flow into the small tank 34, the inside of the small tank 34 can be kept vacant to allow the float 38 to be kept at the lowermost position. Then, when flush water flows into the small tank 34 beyond the upper edge 34d of the small tank 34, the float 38 can be quickly moved upwardly to promptly set the water supply valve 32 to the water stopping state.

In the flush water supply device 22 according to the first embodiment, in order to drain flush water in the small tank 34, the small hole 34b is formed in the bottom wall 34a of the small tank 34, in addition to the check valve mounting holes 34c, so that it becomes possible to quickly drain flush water in the small tank 34, from the small hole 34b and the mounting holes 34c. Further, as compared to cases where the small hole 34b is not formed in the bottom wall 34a of the small chamber 34, it becomes possible to reduce a movement distance of the check valve 36 required for opening the small hole 34b and the mounting holes 34c, and stably drain flush water in the small tank 34 only by a slight downward movement of the check valve 36. Thus, the flush water supply device 22 can ensure reliability.

In the flush water supply device 22 according to the first embodiment, the small tank 34 can be detachably attached to the lateral side of the water supply pipe 30 fixedly attached to the water storage tank 18. In this case, a plurality of types of small tanks 34 each having a different capacity may be prepared, so that one of the small tanks 34 can be replaced with another one suitable for an amount of flush water in the water storage tank 18. Thus, it becomes possible to stably drain flush water in the small tank 34, so that the flush water supply device 22 can ensure reliability.

In the flush water supply device 22 according to the first embodiment, an operation for attaching the small tank 34 to the water supply pipe 30 can be performed as follows. In a zone of the water supply pipe 30 located below lower ends of the convex portions 52, i.e., devoid of the convex portions 52 (in FIG. 4, a zone of the water supply pipe 30 below the position upwardly away from the bottom wall 18a of the water storage tank 18 by the given heightwise distance a), the fitting portion 54 of the small tank 34 is conformably brought into contact with the water supply pipe 30 to surround approximately one-half of an outer periphery of the water supply pipe 30, and each of the recesses 56 of the small tank 34 is positioned just below a respective one of the convex portions of the water supply pipe 30. Then, in this state, the small tank 34 is moved upwardly, so that each of the convex portions 52 of the water supply pipe 30 is fittingly engaged with a respective one of the recesses 56 in the fitting portion 54 of the small tank 34. In this manner, the small tank 34 can be detachably attached to the water supply pipe 30. Thus, the small tank 34 can be replaced with another type suitable for an amount of flush water in the water storage tank 18, with a simple structure comprised of the convex portions 52 of the water supply pipe 30 and the recesses 56 of the fitting portion 54 of the small tank 34. This makes it possible to stably drain flush water in the small tank 34, so that the flush water supply device 22 can ensure reliability.

In the flush water supply device 22 according to the first embodiment, the small tank 34 is formed to partially surround a side surface (outer peripheral surface) 30d of the water supply pipe 30 in a state in which the small tank 34 is fittingly engaged with the water supply pipe 30, so that the vertical height dimension of the small tank 34 can be set to a small value, while allowing the small tank 34 to be detachably attached to the water supply pipe 30.

If a vertical height dimension of the small tank 34 is simply set to a small value, so as to allow the small tank 34 to be formed in a flattened shape in which a maximum vertical length h becomes less than a maximum horizontal (longitudinal) length l by a given value, a height of the water level within the small tank 34 becomes relatively low, thereby causing difficulty in sufficiently obtaining buoyancy of the float 38. In this regard, the small tank 34 is formed in a generally C shape in top plan view, and the float 38 is formed to have an outer peripheral shape approximately conforming to the internal shape of the small tank 34, thereby making it possible to increase a pressure-receiving surface area of the buoyancy producing portion 38b of the float 38 to increase the buoyancy. Thus, the float 38 can be stably moved upwardly to stably set the water supply valve 32 to the water stopping state, so that the flush water supply device 22 can ensure reliability.

Next, with reference to FIGS. 14 to 16, a flush water supply device according to a second embodiment of the present invention will be described.

Figure 14:
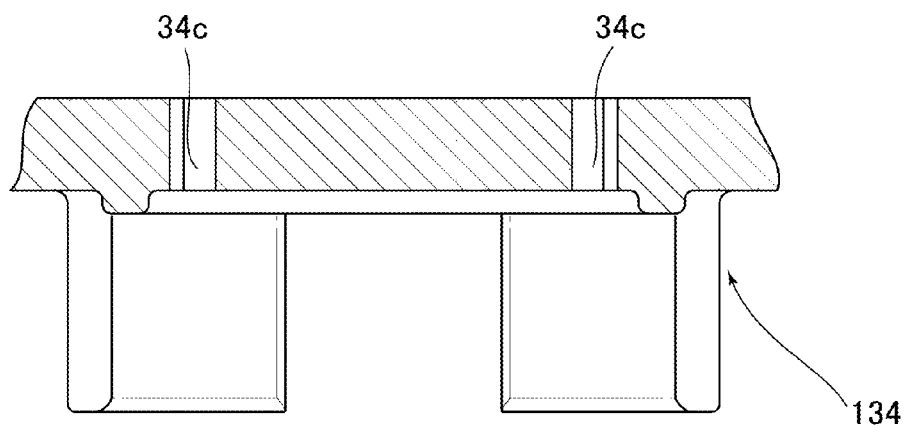
FIG. 14 is a sectional view corresponding to FIG. 11, in a small tank of a flush water supply device according to a second embodiment of the present invention.

FIG. 14 is a sectional view corresponding to FIG. 11, in a small tank of the flush water supply device according to the second embodiment of the present invention. FIG. 15 is a top plan view illustrating a check valve of the flush water supply device according to the second embodiment of the present invention, and FIG. 16 is a front sectional view illustrating the check valve of the flush water supply device according to the second embodiment of the present invention.

Figure 15:
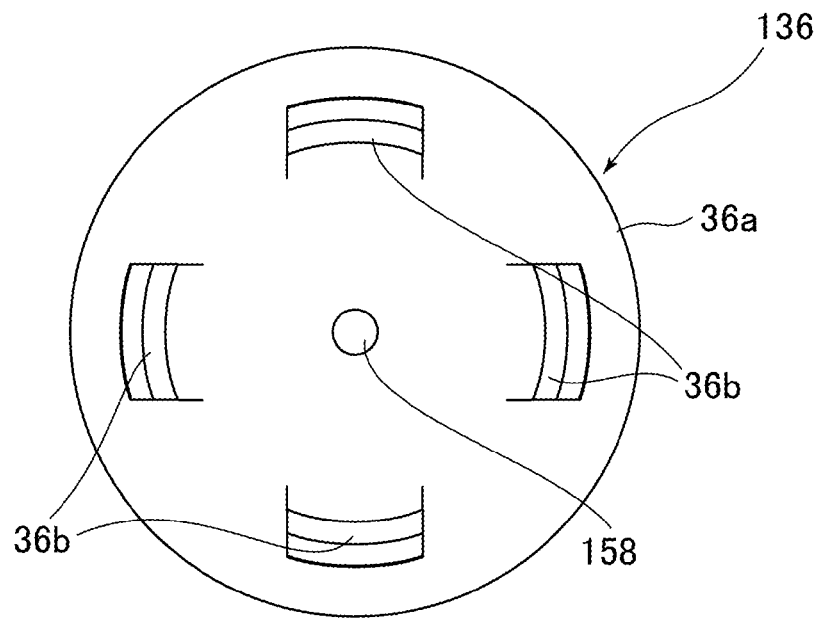
FIG. 15 is a top plan view illustrating a check valve of the flush water supply device according to the second embodiment of the present invention.
Figure 16:
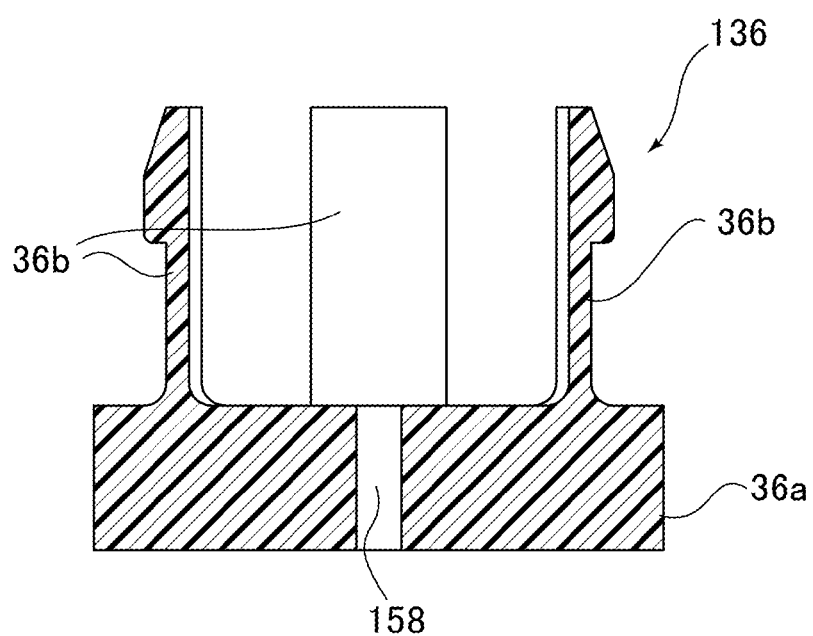
FIG. 16 is a front sectional view illustrating the check valve of the flush water supply device according to the second embodiment of the present invention.

In FIGS. 14 to 16, the same element or component as that in the flush water supply device according to the first embodiment of the present invention is assigned with the same reference numeral or code, and its description will be omitted.

The flush water supply device according to the second embodiment of the present invention is structurally different from the flush water supply device according to the first embodiment of the present invention, in terms of only a small tank and a check valve, but the remaining elements or components thereof are the same as those in the first embodiment of the present invention. Thus, only the small tank and the check valve structurally different from those in the first embodiment will be described below.

As illustrated in FIG. 14, the small tank 135 of the flush water supply device 122 according to the second embodiment of the present invention is devoid of an element equivalent to the small hole 34b of the bottom wall 34a of the small tank 34 in the flush water supply device according to the first embodiment of the present invention.

Further, as illustrated in FIGS. 15 and 16, the check valve 136 of the flush water supply device 122 according to the second embodiment of the present invention comprises a valve section 36a having a small hole 158 formed in an approximately central region thereof to penetrate therethrough in an up-down direction.

In the flush water supply device 122 according to the second embodiment of the present invention, flush water flowing out of an inside of the small tank 134 via four mounting holes 34c of the check valve 136 can be promptly drained additionally from the small hole 158 of the check valve 136. Further, as compared to cases where the small hole 158 is not formed in the check valve 136, it becomes possible to reduce a movement distance of the check valve 136 required for opening the mounting holes 34c and the small hole 158, and stably drain flush water in the small tank 134 only by a slight downward movement of the check valve 136. Thus, the flush water supply device 122 can ensure reliability.

Next, with reference to FIG. 17, a flush water supply device according to a third embodiment of the present invention will be described.

Figure 17:
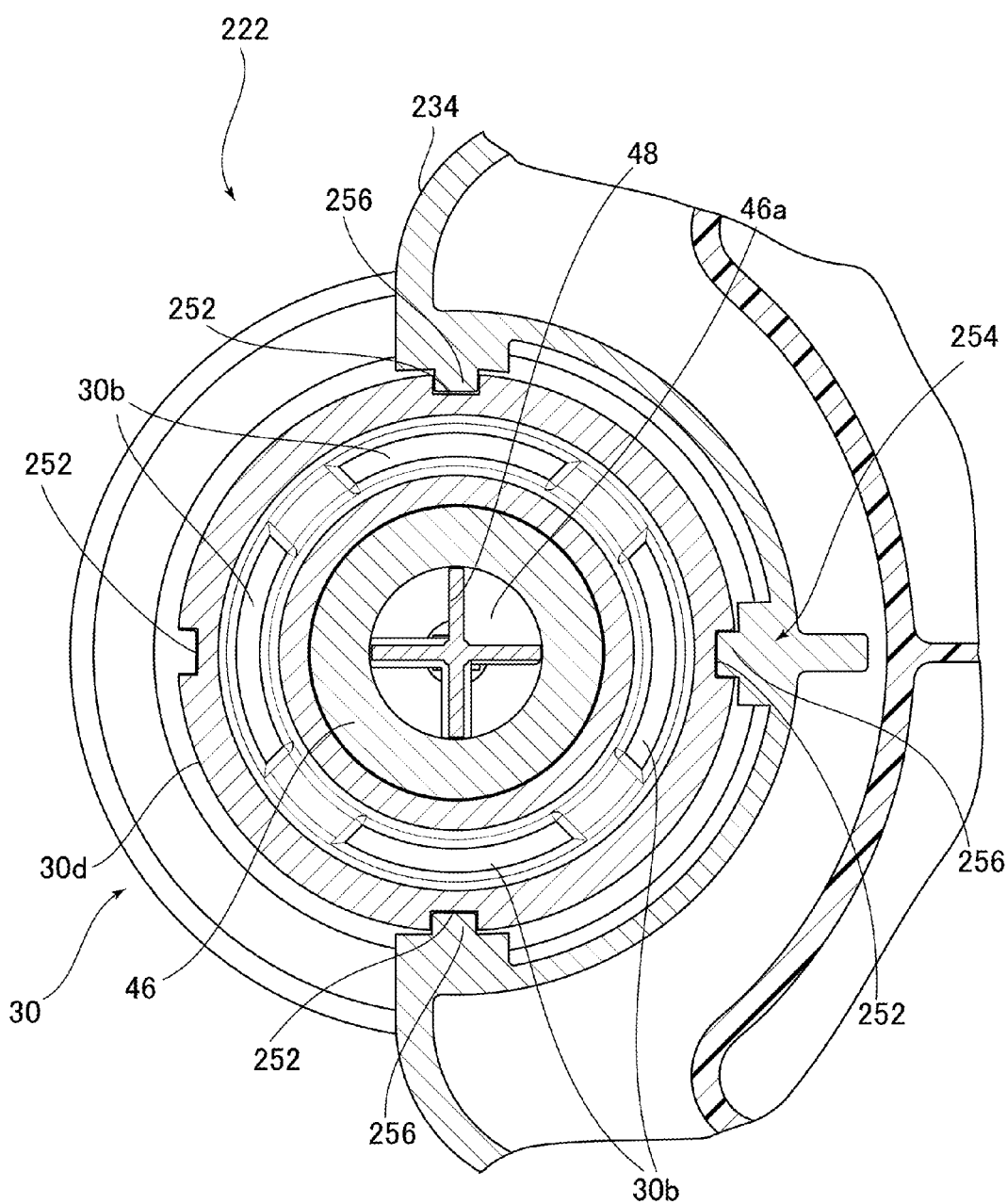
FIG. 17 is a fragmentary enlarged sectional view enlargedly illustrating a fitting region between a water supply pipe and a small tank in a flush water supply device according to a third embodiment of the present invention.

FIG. 17 is a fragmentary enlarged sectional view enlargedly illustrating a fitting region between a water supply pipe and a small tank in the flush water supply device according to the third embodiment of the present invention.

In FIG. 17, the same element or component as that in the flush water supply device according to the first embodiment of the present invention illustrated in FIG. 9 is assigned with the same reference numeral or code, and its description will be omitted.

As illustrated in FIG. 17, in the flush water supply device 222 according to the third embodiment of the present invention, the water supply pipe 30 has four recesses 252 integrally formed on a lateral surface 30d thereof at even intervals to recess inwardly. Each of the recesses 252 is formed to extend from a position of the water supply pipe 30 upwardly away from a bottom wall 18a of a water storage tank 18 by a given heightwise distance a, to the upper end of the water supply pipe 30, in an up-down direction.

On the other hand, as illustrated in FIG. 17, the small tank 234 has a fitting portion 254 formed to be fittingly engageable with the recesses 252 in the lateral surface 30d of the water supply pipe 30. The fitting portion 254 is formed in a generally half-cylindrical shape having a generally C-shaped surface 54a capable of surrounding an approximately one-half region of the lateral surface 30d of the water supply pipe 30 when the small tank 234 is attached to the lateral surface 30d of the water supply pipe 30. The C-shaped surface 54a of the fitting portion 254 of the small tank 234 has three convex portions 256 each formed to protrude inwardly in a manner fittingly engageable with a respective one of three of the recesses 252 in the lateral surface 30d of the water supply pipe 30 to extend in the up-down direction, at a position opposed to the recess 252.

In the flush water supply device 222 according to the third embodiment, in an operation for attaching the small tank 234 to the water supply pipe 30, the small tank 234 is moved in a lateral direction and conformably brought into contact with a region of the water supply pipe 30 located below a position upwardly away from the bottom wall 18a of the water storage tank 18 by a given heightwise distance a. Then, the small tank 234 is moved upwardly to allow each of the recesses 252 of the water supply pipe 30 to be fittingly engaged with a respective one of the convex portions 256 in the fitting portion 254 of the small tank 234, so that the small tank 234 can be replaced with another type suitable for an amount of flush water in the water storage tank 18, with a simple structure. Thus, it becomes possible to stably drain flush water in the small tank 234, so that the flush water supply device 222 can ensure reliability.

Next, with reference to FIGS. 18 to 21, a flush water supply device according to a fourth embodiment of the present invention will be described.

Figure 18:
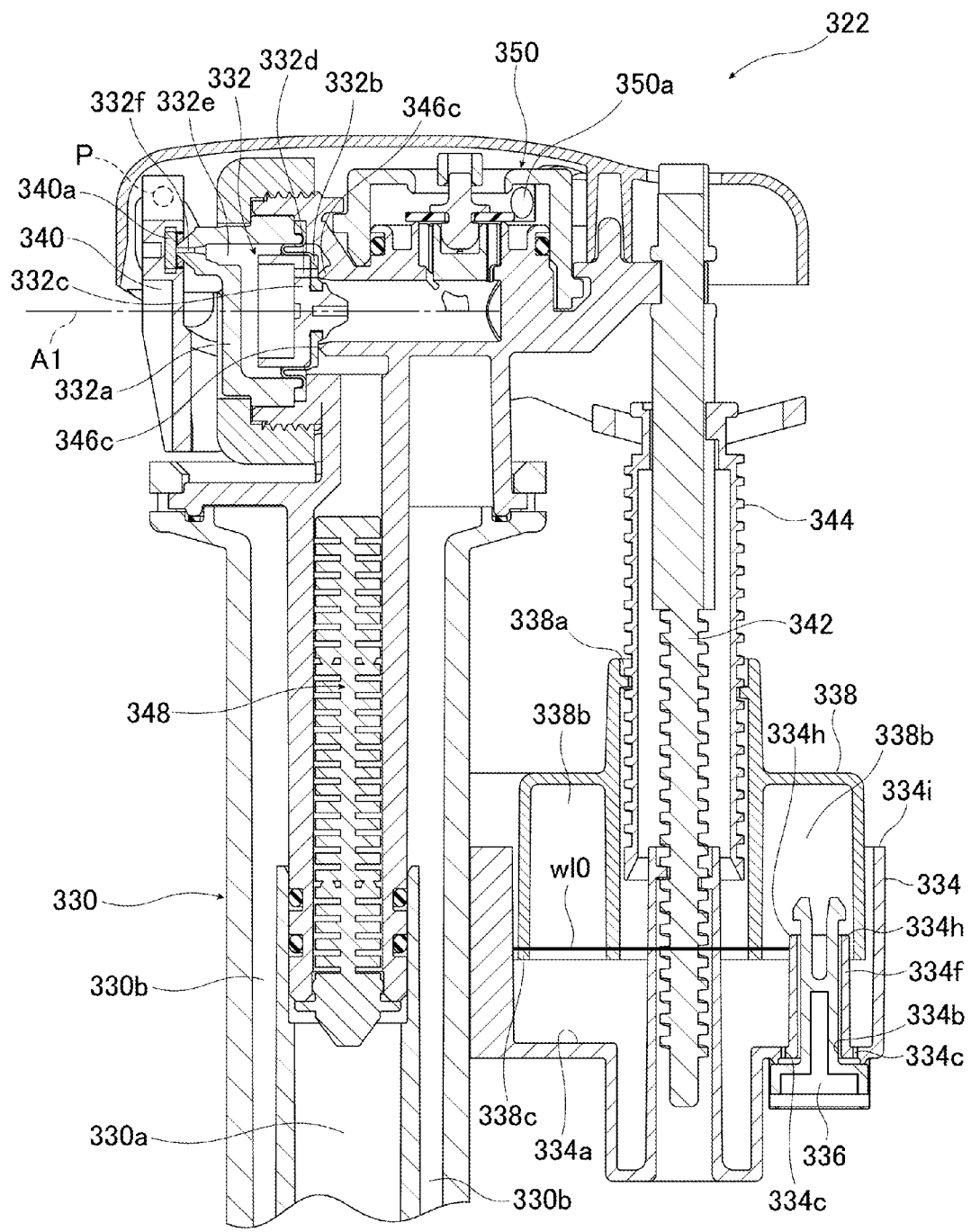
FIG. 18 is a fragmentary enlarged sectional view enlargedly illustrating a part of a flush water supply device according to a fourth embodiment of the present invention, in a water stopping state (valve closed state).
Figure 19:
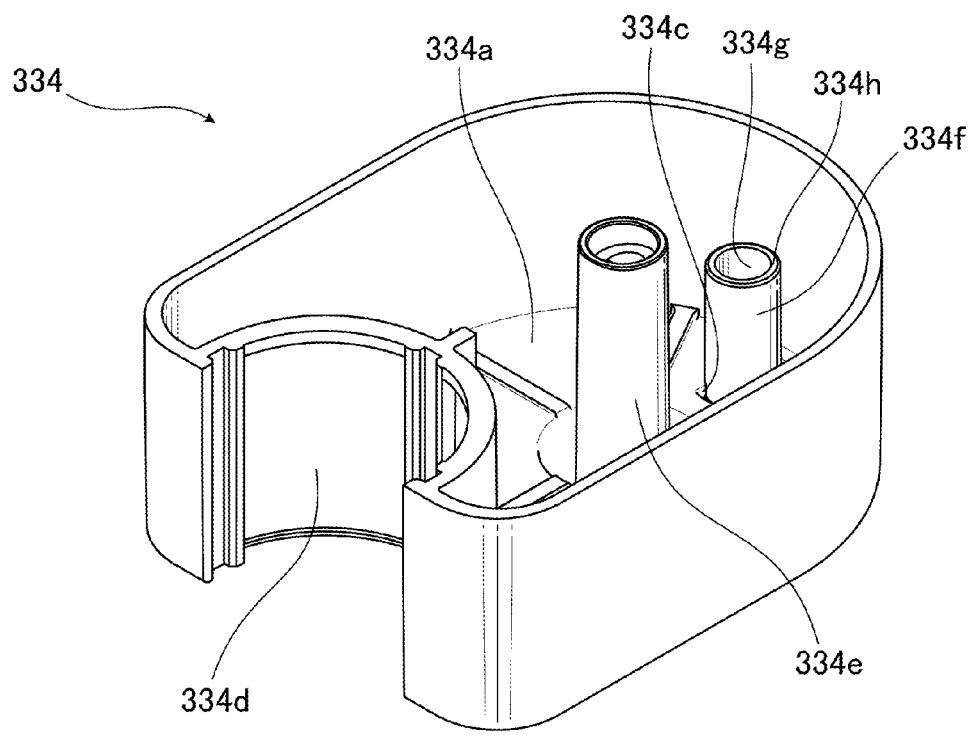
FIG. 19 is a perspective view illustrating a small tank of the flush water supply device according to the fourth embodiment of the present invention.
Figure 20:
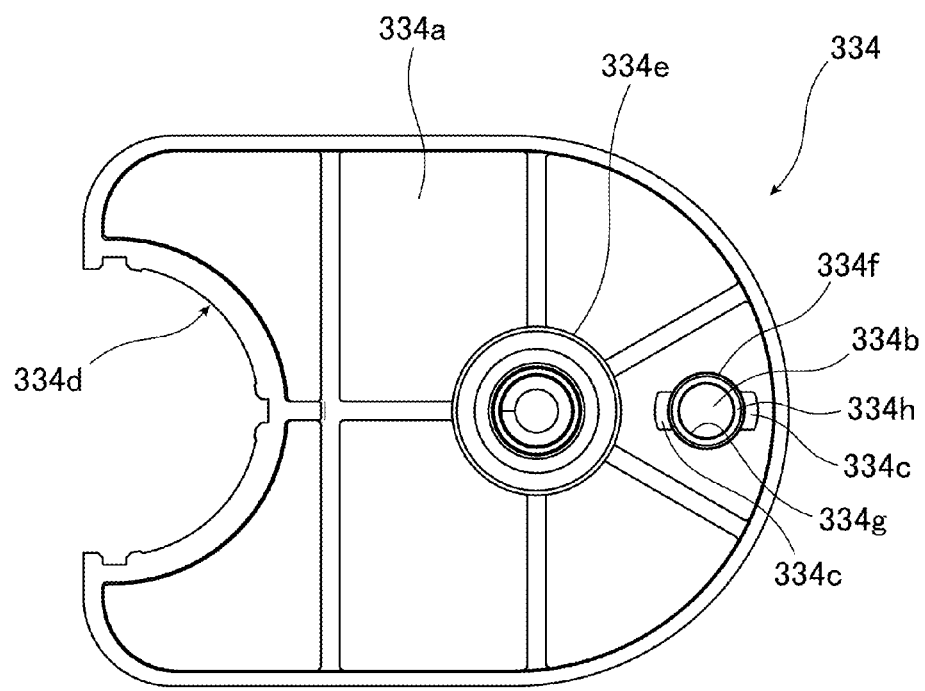
FIG. 20 is a top plan view illustrating the small tank of the flush water supply device according to the fourth embodiment of the present invention.
Figure 21:
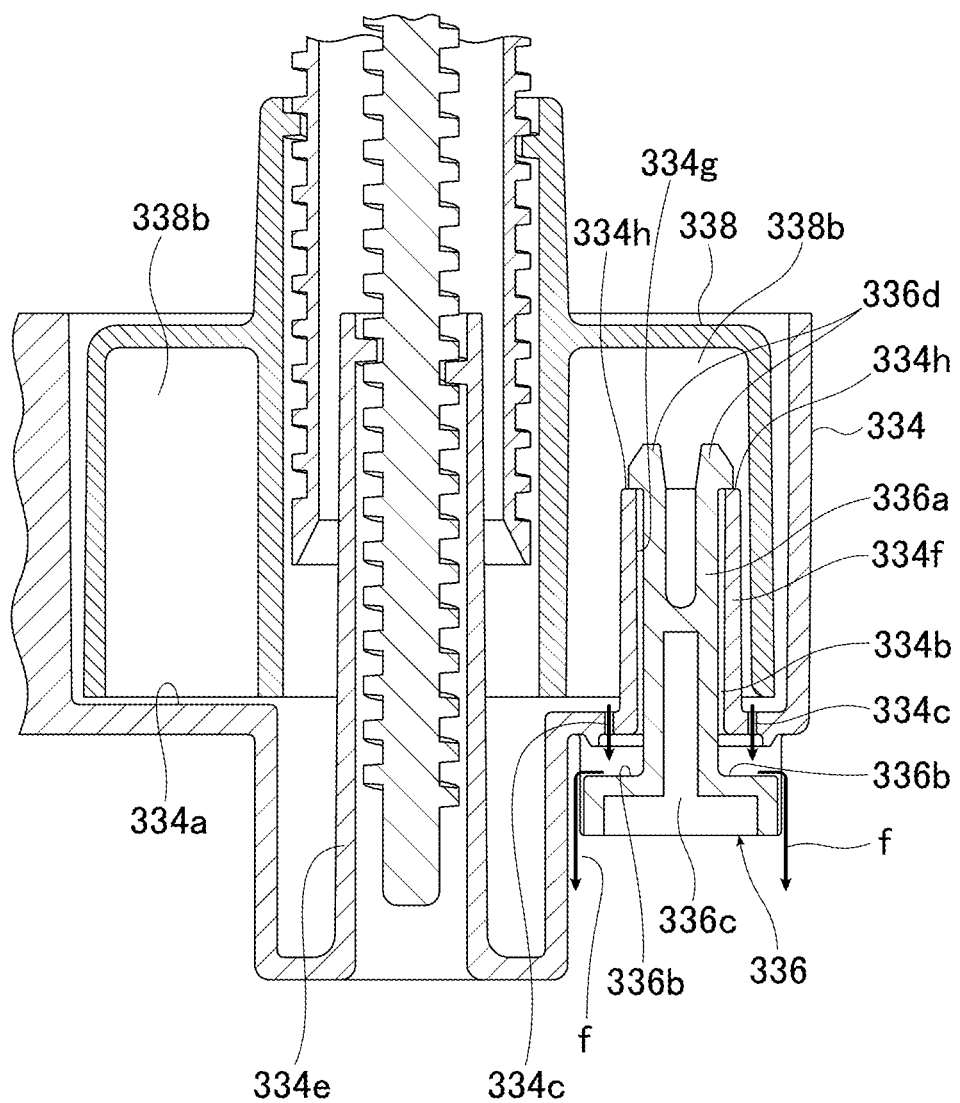
FIG. 21 is a fragmentary enlarged sectional view enlargedly illustrating the small tank, a float and a check valve of the flush water supply device according to the fourth embodiment of the present invention, in a water supplying state (valve open state).

FIG. 18 is a fragmentary enlarged sectional view enlargedly illustrating a part of the flush water supply device according to the fourth embodiment of the present invention, in a water stopping state (valve closed state). FIG. 19 is a perspective view illustrating a small tank of the flush water supply device according to the fourth embodiment of the present invention, and FIG. 20 is a top plan view illustrating the small tank of the flush water supply device according to the fourth embodiment of the present invention. FIG. 21 is a fragmentary enlarged sectional view enlargedly illustrating the small tank, a float and a check valve of the flush water supply device according to the fourth embodiment of the present invention, in a water supplying state (valve open state).

As illustrated in FIGS. 18 to 21, the small tank 334 is formed in a generally horizontally-long flattened shape in which in which a maximum vertical length becomes less than a maximum horizontal (longitudinal) length. The small tank 334 has a water-supply-pipe attaching portion 334d adapted to be detachably attached to a lateral side of a water supply pipe 330 fixedly attached to a water storage tank 318, and a fixing portion 334e formed to extend from an approximately central region of a bottom wall 334a thereof in an up-down direction, and adapted to allow a portion of a fixed shaft member 342 to be inserted thereinto and threadingly engaged therewith, thereby fixing a position of the small tank 334 in the up-down direction. In this case, a plurality of types of small tanks each having a different capacity to receive therein flush water may be prepared, so that one of the small tanks 334 can be appropriately replaced with another one suitable for on an amount of flush water in the water storage tank 318 to be used for toilet flushing.

The small tank 334 comprises a tubular member 334f extending upwardly from the bottom wall 334a thereof, while surrounding a periphery of a mounting hole 334b formed in the bottom wall 334a. An inner surface 334g of the tubular member 334*f* extends continuously from the mounting hole 334*b* of the bottom wall 334*a* of the small tank 334 upwardly, to substantially form a vertical hole-shaped mounting hole to which a support section 336*a* of an aftermentioned check valve 336 is to be insertingly attached.

The tubular member 334*f* is not limited to the configuration in which the inner surface 334*g* thereof extends continuously from the mounting hole 334*b* of the bottom wall 334*a* of the small tank 334 upwardly, but may be formed such that the inner surface extends upwardly from a position spaced apart from the mounting hole 334*b* of the bottom wall 334*a* of the small tank 334 in a radially outward direction of the mounting hole 334*b* by a given distance.

The float 338 is made of a resin material, and formed to have an outer peripheral shape approximately conforming to an internal shape of the small tank 334 in a manner capable of being received inside the small tank 334.

As illustrated in FIGS. 18 to 21, the float 338 has a shape opened only downwardly, and internally has a buoyancy producing portion 338*b* for producing buoyancy based on air in an internal space of the float 338 and flush water in the small tank 334.

As illustrated in FIGS. 18 to 21, the tubular member 334*f* of the small tank 334 has an upper end 334*h* formed to be opened upwardly. As illustrated in FIG. 18, the tubular member 334*f* is disposed in the internal space (buoyancy producing portion 338*b*) of the float 338.

In FIG. 18, a water level within the small tank 334 when the float 338 is moved upwardly during the water stopping state, and located at a position where a balance between a self-weight of the float 338 and buoyancy based on flush water in the small tank 334 is achieved is designated by the code w10. At this position, although air is held in the internal space (buoyancy producing portion 338*b*) of the float 338, and the flush water in the small tank 334 scarcely flows into the internal space of the float 338, the water level w10 within the small tank 334 is located slightly above a lower end 338*c* of the float 338 due to a pressure of flush water around the lower end 338*c* of the float 338.

Further, the water level w10 within the small tank 334 is substantially equal to a water level within the small tank 334 causing start of water supply through the flush water supply device 322.

As illustrated in FIG. 18, the upper end 334*h* of the tubular member 334*f* is located above the lower end 338*c* of the float 338 and the water level w10 within the small tank 334 is substantially equal to a water level within the small tank 334 *c* when the float 338 is moved upwardly during the water stopping state and located at the position where a balance between the self-weight of the float 338 and buoyancy based on flush water in the small tank 334 is achieved. This makes it possible to prevent flush water in the small tank 334 from entering the tubular member 334*f*, even if the upper end 334*h* of the tubular member 334*f* is opened upwardly, and prevent flush water in the small tank 334 from flowing out of the check valve mounting hole 334*b*. Further, the tubular member 334*f* of the small tank 334 is disposed to avoid interference with the float 338 so as to prevent erroneous movements of the float 338.

As illustrated in FIG. 21, the bottom wall 334*a* of the small tank 334 has two small holes 334*c* formed at respective positions outward of and on right and left sides of a base end of the tubular member 334*f* to drain flush water in the small tank 334.

The small holes 334*c* may be arranged at respective positions on front and rear sides of the base end of the tubular member 334*f* of the small tank 334.

The check valve 336 is made of a material having a specific gravity less than that of water (e.g., a resin material), so that it becomes possible to move the check valve 336 upwardly and downwardly according to the flush water level within the water storage tank 318. The check valve 336 is inserted into the mounting hole 334*b* of the small tank 334 from therebelow and attached to the mounting hole 334*b* in a manner capable of opening and closing the small holes 334*c* of the small tank 334, and adapted to be moved upwardly and downwardly by means of buoyancy, according to the flush water level in the water storage tank 318.

More specifically, as illustrated in FIG. 21, the check valve 336 has: a generally disk-shaped valve section 336*b* adapted to be moved upwardly and downwardly according to a change in water level within the water storage tank 318, thereby closing and opening the small holes 334*c* of the small tank 334; a support section 336*b* formed to extend upwardly from an upper surface of the valve section 336*b* and insertingly attached to the mounting hole 334*b* of the small tank 334 and the tubular member 334*f*; and a buoyancy producing section 336*c* formed in a bottom wall of the valve section 336*b* to have a ventral region concaved upwardly toward an inside of the support section 336*a*, and adapted to produce buoyancy based on flush water in the water storage tank 318.

Further, as illustrated in FIG. 21, the support section 336*a* of the check valve 336 has an upwardly-extending distal end provided with a lockable portion 336*d* formed to protrude horizontally outwardly. The lockable portion 336*d* is adapted to be locked by the upper end 334*h* of the tubular member 334*f* when the check valve 336 is moved downwardly to a lowermost position with respect to the small tank 334, thereby preventing the check valve 336 from dropping off from the small tank 334.

In the third embodiment, the check valve 336 itself is made of a material having a specific gravity less than that of water (e.g., a resin material), and the buoyancy producing section 336*c* of the check valve 336 is configured to form a space for holding air therein. Alternatively, the buoyancy producing section 336*c* may be made of a material having a specific gravity less than that of water (e.g., a resin material) and formed in a solid structure while eliminating a space for holding air therein.

Further, as illustrated in FIG. 18, the check valve 336 is adapted, when the water level within the water storage tank 318 is raised, to quickly close the small holes 334*c* of the small tank 334 by means of buoyancy, according to the water level within the water storage tank 318. Thus, just before the water level within the water storage tank 18 is raised beyond an upper edge 334*i* of the small tank 334 to cause flush water to flow into the small tank 334, an inside of the small tank 334 can be kept vacant to allow the float 338 to be kept at its lowermost position. Then, when flush water flows into the small tank 334 beyond the upper edge 334*i* of the small tank 334, the float 338 can be quickly moved upwardly to promptly set a water supply valve 332 to the water stopping state.

Next, with reference to FIGS. 18 to 21, operations (functions) of the flush water supply device according to the fourth embodiment, the flush water tank assembly equipped with the flush water supply device, and the flush toilet equipped with the flush water tank assembly, will be described.

In two types of flushing modes: a full flushing mode and a partial flushing mode, to be performed by the flush water tank assembly equipped with a flush water supply device in the fourth embodiment, fundamental operations during the full flushing mode and during the partial flushing mode are the same, except that: a time period of an open state of a discharge port 320 of the water storage tank 318 during the full flushing mode is greater than that during the partial flushing mode, because a pull-up amount of a valve element (not illustrated) of the water discharge valve device 324 by a control wire 328 during the full flushing mode is greater than that during the partial flushing mode; and a dead water level DWL during the full flushing mode is lower than that during the partial flushing mode. Thus, the following description will be made about only operations during the full flushing mode.

As illustrated in FIGS. 18 to 21, in a state just before start of water discharge by the water discharge valve device 324, the valve element (not illustrated) of the water discharge valve device 324 closes up the discharge port 320, so that an initial water level within the water storage tank 318 becomes equal to a maximum water level WL0, and the float 338 is located under flush water.

Then, as illustrated in FIG. 18, when a user manually moves a manual operation lever 326, the water discharge valve device 324 operates to open the discharge port 320 of the water storage tank 318 to start water discharge from the flush water tank assembly 316 to a toilet main unit 302 of a flush toilet 301, in the full flushing mode, so that the water level within the water storage tank 318 starts being lowered. In this process, the float 338 is moved upwardly by means of buoyancy based on flush water in the small tank 334, and then maintained in a stationary state at its uppermost position.

Then, as illustrated in FIG. 18, when the water level within the water storage tank 318 is lowered with respect to the maximum water level WL0, but the water level within the water storage tank 318 is higher than a water level WL2 causing start of water supply through the flush water supply device 322, the float 338 is still maintained in a stationary state at the uppermost position, so that water supply through the flush water supply device 22 is not performed even when the water level within the water storage tank 318 is lowered to a water-stopping water level WL1.

Then, as illustrated in FIGS. 18 and 21, when the water level within the water storage tank 318 becomes lower than the water level WL2 which is approximately equal to a height position of the bottom wall 334*a* of the small tank 334, the buoyancy acting on the check valve 336 based on flush water in the water storage tank 318 is less than a self-weight of the check valve 336, so that the check valve 336 is moved downwardly to open the small holes 334*b* of the bottom wall 334*a* of the small tank 334.

Thus, as indicated by the flow f in FIG. 21, flush water in the small tank 334 is drained from the small holes 334*b* of the bottom wall 334*a* of the small tank 334, and the water level within the small tank 334 starts being lowered from its maximum water level equal to a height position of an upper edge 334*i* of the small tank 334. In this process, before the water level within the small tank 334 is lowered to the water supply starting water level wl0, the buoyancy acting on the buoyancy producing portion 338*b* of the float 338 is greater than a self-weight of the float 38, so that the float 38 is still maintained in a stationary state at the uppermost position. In the fourth embodiment, the water supply starting water level wl (Wl0) within the small tank 334 is set to be higher than the water level WL2 within the water storage tank 318.

In this state, as illustrated in FIG. 18, the upper end 334*h* of the tubular member 334*f* is located within the internal space (buoyancy producing portion 338*b*) of the float 338, and above the water level wl0 within the small tank 334 in a situation where the float 338 is moved upwardly during the water stopping state and then located at a position where a balance between the self-weight of the float 338 and buoyancy based on flush water in the small tank 334 is achieved, and a height position of the lower end 338*c* of the float 338. Thus, even if the upper end 334*h* of the tubular member 334*f* is opened upwardly, flush water in the small tank 334 is kept from entering the tubular member 334*f*.

On the other hand, when the water level within the small tank 334 is lowered beyond the water supply starting water level wl0, the buoyancy acting on the buoyancy producing portion 338*b* of the float 338 becomes less than the self-weight of the float 338, so that the float 338 is moved downwardly. Then, according to the downward movement of the float 338, a swingable member 340 is swingingly moved about the fulcrum P, and a valve member 340*a* of the swingable member 340 is moved to open a pilot hole 332*f* of the water supply valve 332, so that a valve element 332*c* is moved leftwardly (in FIG. 18) to establish a state in which a valve seat 346*c* of a water supply passage-forming member 346 located at an upstream end of a secondary water supply passage 346*b* is opened (water supplying state). In this state, flush water is supplied from an outlet port 330*c* of the secondary water supply passage 330*b* of the water supply pipe 330.

Then, when the water level within the water storage tank 318 is lowered to the dead water level DWL, the water discharge valve device 324 operates to close the discharge port 320 of the water storage tank 318. During the above process, the water level within the small tank 334 becomes zero, so that the water supply valve 332 is kept opened to allow the water supply to the water storage tank 318 to be continuously performed through the flush water supply device 322. Thus, the water level within the water storage tank 318 is gradually raised from the dead water level DWL.

Then, when the water level within the water storage tank 318 is raised to the water level WL2, the check valve 336 is moved upwardly to close the small holes 334*c* and the mounting hole 334*b* of the small tank 334.

At this timing, the water level within the small tank 334 is still kept zero. However, when the water level within the water storage tank 318 is further raised to cause flush water to flow into the small tank 334 beyond the upper edge 334*i* of the small tank 334, the water level within the small tank 334 is rapidly raised, so that the float 338 is quickly moved upwardly to promptly set the water supply valve 332 to the water stopping state.

In the flush water supply device 322 according to the fourth embodiment of the present invention, the bottom wall 334*a* of the small tank 334 is formed with the mounting hole 334*b* for allowing the check valve 336 to be attached thereto, and the tubular member 334*f* extending upwardly while surrounding the periphery of the mounting hole 334*b*, so that it becomes possible to prevent flush water in the small tank 334 from flowing out of the mounting hole 334*b* for the check valve 336, thereby adequately controlling a timing of water supply from the flush water supply device 322 into the water storage tank 318. Thus, it becomes possible to prevent the occurrence of a phenomenon, so-called "tail flushing", that, when flush water is being supplied from the water storage tank 318 to the toilet main unit 302, water supply is started at a timing earlier than a desired timing, and thus the supplied flush water is discharged as wasteful water to the toilet main unit 302 together with flush water preliminarily stored in the water storage tank 318, or to prevent the occurrence of a situation where the timing of water supply becomes later than a desired timing, and thus it needs to take a longer time for fully storing flush water in the water storage tank 318.

In the flush water supply device 322 according to the fourth embodiment of the present invention, the upper end 334h of the tubular member 334f is located above the water level wl0 within the small tank 334 in a situation where the float 338 is moved upwardly during the water stopping state and then located at a position where a balance between the self-weight of the float 338 and buoyancy based on flush water in the small tank 334 is achieved, and the lower end 338c of the float 338. Therefore, even if the upper end 334h of the tubular member 334f is opened upwardly, it becomes possible to prevent intrusion of water from the inside of the small tank 334 into the tubular member 334f, and prevent outflow of flush water in the small tank 334 from the mounting hole 334b for the check valve 336. Thus, it becomes possible to adequately control the timing of water supply from the flush water supply device 322 into the water storage tank 318.

In addition, as means to prevent flush water in the small tank 334 from flowing out of the mounting hole 334b for the check valve 336, the tubular member 334f which is a simple tubular-shaped structure provided on the bottom wall 334a of the small tank 334 is employed, so that it becomes possible to provide a simple and compact structure.

Further, as illustrated in FIG. 21, the tubular member 334f is disposed in the internal space (buoyancy producing portion 338b) of the float 338, in such a manner as to prevent the tubular member 334f of the small tank 334 and the distal end (lockable portion 336d) of the support section 336a of the check valve 336 the float 338 from coming into contact with the float 338 even when the float 338 is moved downwardly to the lower most position with respect to the small tank 334. Thus, it becomes possible to avoid interference between the tubular member 334f and the float 338 so as to prevent erroneous movements of the float 338.

In the flush water supply device 322 according to the fourth embodiment of the present invention, as illustrated in FIG. 21, when the check valve 336 is moved downwardly to the lower most position with respect to the small tank 334, the lockable portion 336d of the support section 336a of the check valve 336 is locked (stopped) by the upper end 334h of the tubular member 334f of the small tank 334, thereby preventing the check valve 336 from dropping off from the small tank 334. Further, the lockable portion 336d of the support section 336a of the check valve 336 is locked directly by the upper end 334h of the tubular member 334f of the small tank 334, so that it becomes possible to eliminate a need for additionally providing means to lock the lockable portion 336d of the support section 336a of the check valve 336, thereby providing a simple structure.

Next, with reference to FIG. 22, a flush water supply device according to a fifth embodiment of the present invention will be described.

Figure 22:
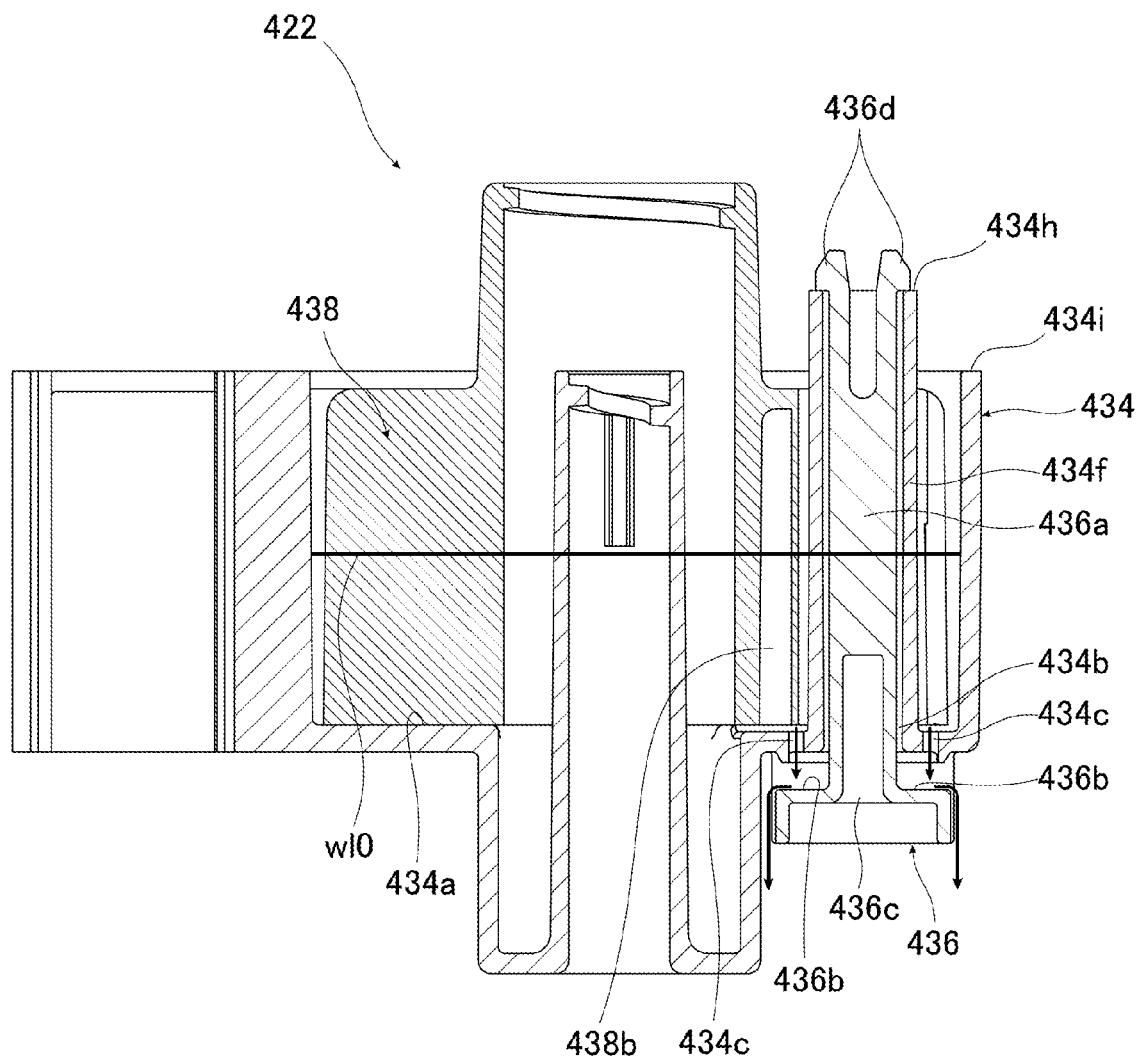
FIG. 22 is a sectional view illustrating a small tank, a float and a check valve of a flush water supply device according to a fifth embodiment of the present invention.

FIG. 22 is a sectional view illustrating a small tank, a float and a check valve of the flush water supply device according to the fifth embodiment of the present invention.

In the flush water supply device 422 according to the fifth embodiment of the present invention, only a float and a tubular member of the small tank are structurally different from the float 338 and the tubular member 344f of the small tank 334 of the flush water supply device 322 according to the fourth embodiment of the present invention, but the remaining elements or components thereof are the same as those in the fourth embodiment. Thus, only the differences from the fourth embodiment will be described below.

In FIG. 22, the float 438 and the check valve 436 of the flush water supply device 422 according to the fifth embodiment are illustrated in a state in which they are moved downwardly to their lowermost positions with respect to the small tank 434, and flush water is supplied from the flush water supply device 422 to a water storage tank 418.

In the flush water supply device 422 according to the fifth embodiment, a bottom wall 434a of the small tank 434 is formed with a mounting hole 434b for allowing the check valve 436 to be attached thereto, and a tubular member 434f extending upwardly while surrounding a periphery of the mounting hole 434b. The tubular member 434f is disposed outside an internal space (buoyancy producing portion 438b) of the float 438.

The tubular member 434f is formed to have an upper end 434h which is opened upwardly, and located above an upper edge 434i of the small tank 434 and a water level wl0 within the small tank 434 in a situation where the float 438 is moved upwardly during the water stopping state and then located at a position where a balance between a self-weight of the float 438 and buoyancy based on flush water in the small tank 434 is achieved. This makes it possible to always prevent flush water in the small tank 434 from entering the tubular member 434f.

As illustrated in FIG. 22, a support section 436a of the check valve 436 has an upwardly-extending distal end with a lockable portion 436d formed to protrude horizontally outwardly. The lockable portion 436d is adapted to be locked by the upper end 434h of the tubular member 434f when the check valve 436 is moved downwardly to a lowermost position with respect to the small tank 434, thereby preventing the check valve 436 from dropping off from the small tank 434.

In the flush water supply device 422 according to the fifth embodiment of the present invention, the tubular member 434f is disposed outside the internal space (buoyancy producing portion 438b) of the float 438, and the upper end 434h of the tubular member 434f is located above the water level wl0 within the small tank 434 during the water stopping state and the upper edge 434i of the small tank 434, so that, even if the upper end 434h of the tubular member 434f of the small tank 434 is an open end, it becomes possible to prevent intrusion of water from an inside of the small tank 434 into the tubular member 434f, and prevent outflow of flush water in the small tank 434 from the mounting hole 434b for the check valve 436. Thus, it becomes possible to adequately control a timing of water supply from the flush water supply device 422 into the water storage tank 418. In addition, the tubular member 434f can be formed in a simple structure. Further, the tubular member 434f is disposed outside the internal space (buoyancy producing portion 438b) of the float 438. Thus, it becomes possible to avoid interference between the tubular member 434f and the float 438 so as to prevent erroneous movements of the float 438.

The fifth embodiment has been described based on an example in which the water level wl0 within the small tank 434 in a situation where the float 438 is moved upwardly during the water stopping state and then located at a position where a balance between the self-weight of the float 438 and buoyancy based on flush water in the small tank 434 is achieved, is set at a position lower than the upper edge 434i of the small tank 434. Alternatively, the water level wl0 within the small tank 434 where a balance between the self-weight of the float 438 and buoyancy based on flush water in the small tank 434 is achieved during the water stopping state, may be set at a position of the upper edge 434*i* of the small tank 434 (maximum water level within the small tank 434). In this case, even when the water level wl0 within the small tank 434 during the water stopping state is equal to the maximum water level, it is also possible to prevent intrusion of water from the inside of the small tank 434 into the tubular member 434*f*, and prevent outflow of flush water in the small tank 434 from the mounting hole 434*b* for the check valve 436.

In the flush water supply device 422 according to the fifth embodiment of the present invention, as illustrated in FIG. 22, when the check valve 436 is moved downwardly to the lower most position with respect to the small tank 434, the lockable portion 436*d* of the support section 436*a* of the check valve 436 is locked (stopped) by the upper end 434*h* of the tubular member 434*f* of the small tank 434, thereby preventing the check valve 436 from dropping off from the small tank 434. Further, the lockable portion 436*d* of the support section 436*a* of the check valve 436 is locked directly by the upper end 434*h* of the tubular member 434*f* of the small tank 434, so that it becomes possible to eliminate a need for additionally providing means to lock the lockable portion 436*d* of the support section 436*a* of the check valve 436, thereby providing a simple structure.

Next, with reference to FIG. 23, a flush water supply device according to a sixth embodiment of the present invention will be described.

Figure 23:
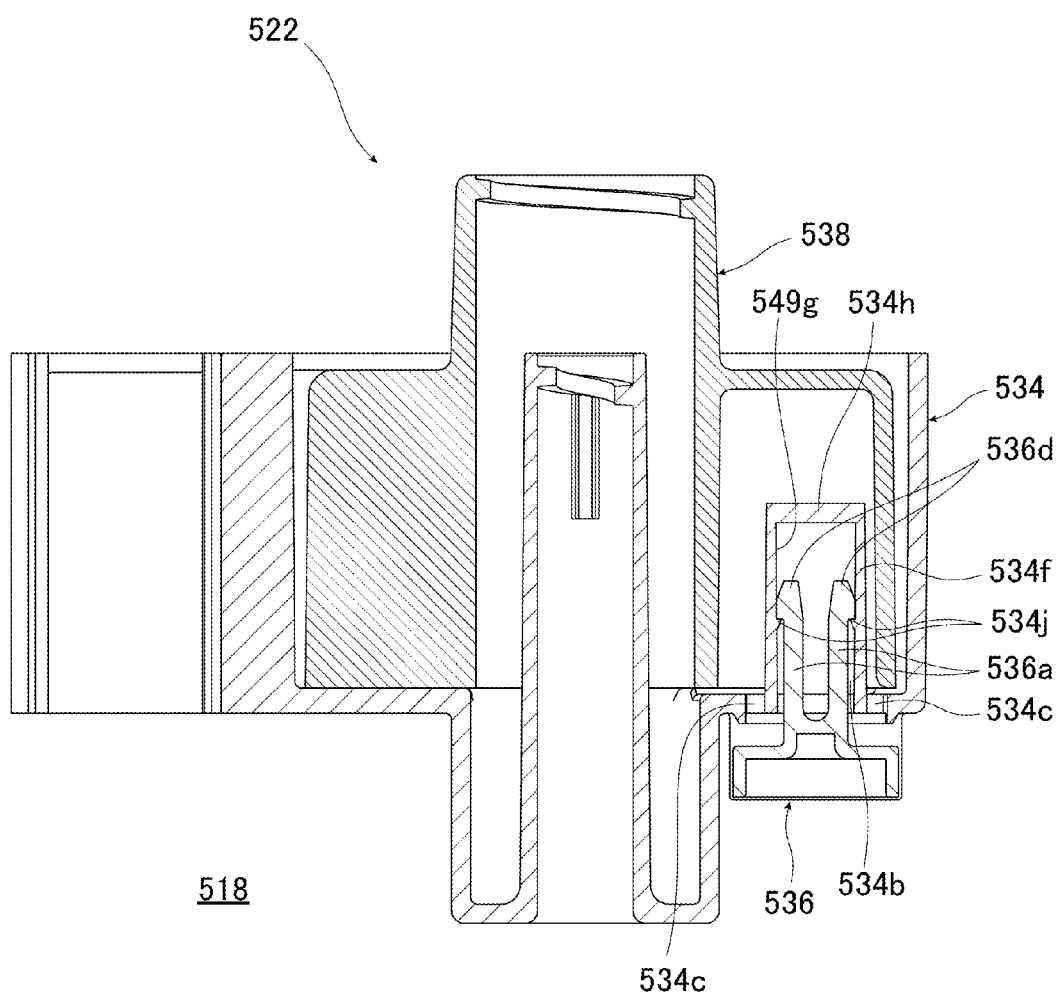
FIG. 23 is a sectional view illustrating a small tank, a float and a check valve of a flush water supply device according to a sixth embodiment of the present invention.

FIG. 23 is a sectional view illustrating a small tank, a float and a check valve of the flush water supply device according to the sixth embodiment of the present invention.

In the flush water supply device 522 according to the sixth embodiment of the present invention, only a tubular member of the small tank is structurally different from the tubular member 344*f* of the small tank 334 of the flush water supply device 322 according to the fourth embodiment of the present invention, but the remaining elements or components thereof are the same as those in the fourth embodiment. Thus, only the difference from the fourth embodiment will be described below.

In FIG. 23, the float 538 and the check valve 536 of the flush water supply device 522 according to the sixth embodiment are illustrated in a state in which they are moved downwardly to their lowermost positions with respect to the small tank 534, and flush water is supplied from the flush water supply device 522 to a water storage tank 518.

In the flush water supply device 522 according to the sixth embodiment, the tubular member 534*f* of the small tank 534 has an upper end 534*h* formed to be closed upwardly.

A support section 536*a* of the check valve 536 has a distal end provided with a lockable portion 536*d* adapted to be locked by a part of the tubular member 534*f* when the check valve is moved downwardly to a lowermost position with respect to the small tank 534, and an inner surface 534*g* of the tubular member 534*f* is provided with a locking stopper portion 534*j* adapted to lock the lockable portion 536*d* of the support section 536*a* of the check valve 536.

In the flush water supply device 522 according to the sixth embodiment of the present invention, the upper end 534*h* of the tubular member 534*f* is closed, so that it becomes possible to prevent intrusion of water from an inside of the small tank 534 into the tubular member 534*f*, and prevent outflow of flush water in the small tank 534 from the mounting hole 534*b* for the check valve 536. Thus, it becomes possible to adequately control a timing of water supply from the flush water supply device 522 into the water storage tank 518. In addition, a height dimension of the tubular member 534*f* can be set to a small value, so that the tubular member 534*f* can be formed in a compact structure.

In the flush water supply device 522 according to the sixth embodiment of the present invention, even when the check valve 536 is moved downwardly to the lowermost position, the lockable portion 536*d* of the support section 536*a* of the check valve 536 and the locking stopper portion 534*j* on the inner surface 534*g* of the tubular member 534*f* can prevent drop-off of the check valve 536 from the small tank 534.

Next, with reference to FIGS. 24 to 29, a flush water supply device according to a seventh embodiment of the present invention will be described.

Figure 24:
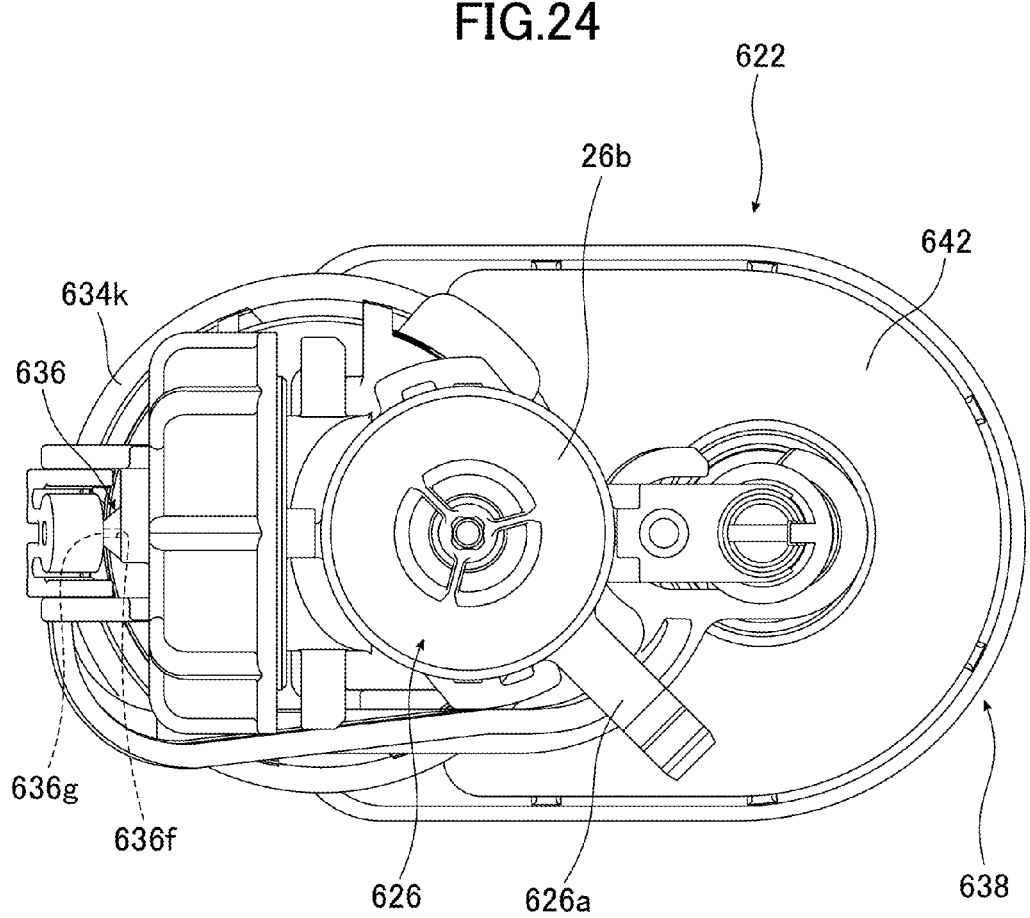
FIG. 24 is a top plan view illustrating a flush water supply device according to a seventh embodiment of the present invention, wherein a cover member is removed therefrom.
Figure 25:
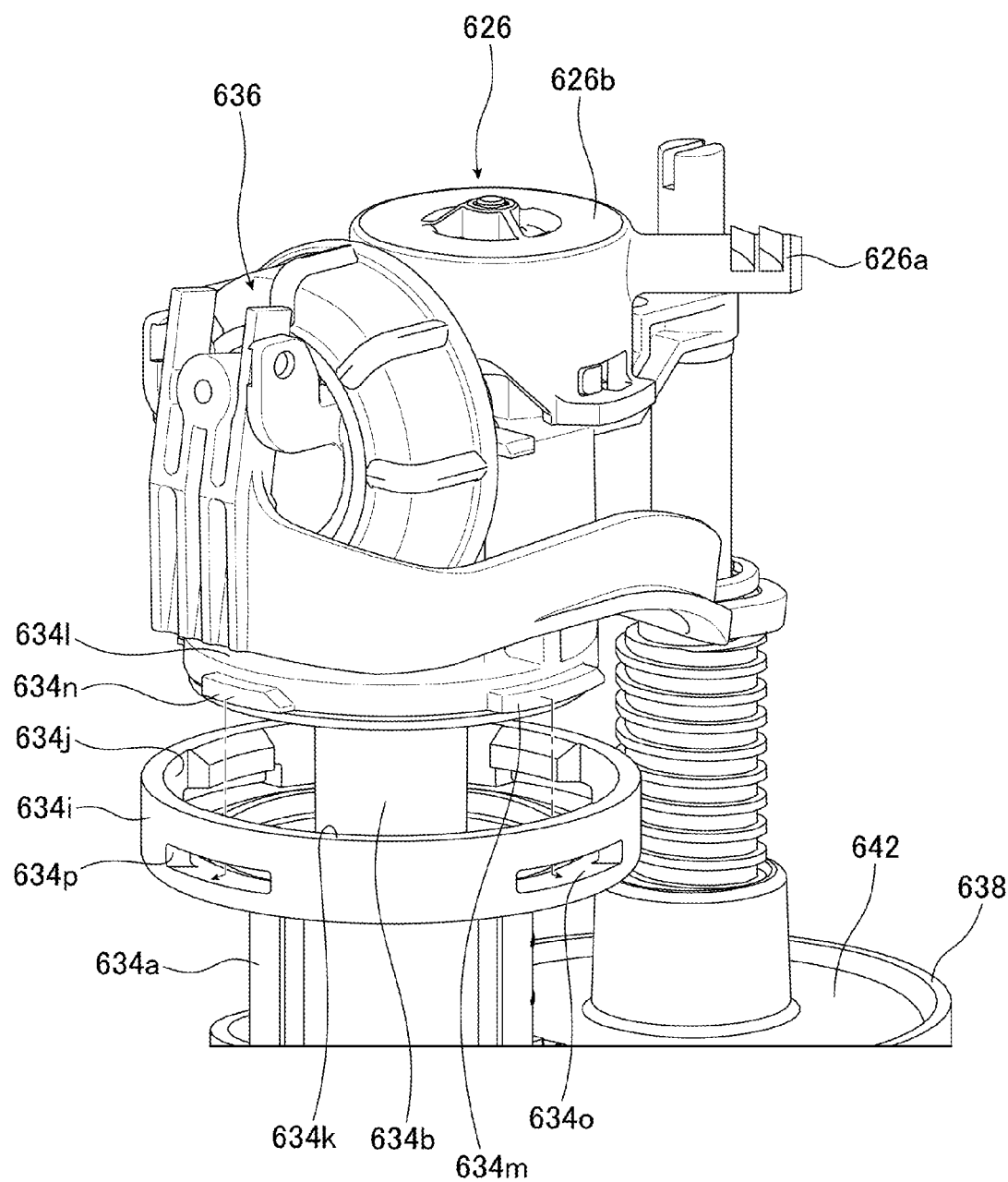
FIG. 25 is a fragmentary exploded perspective view illustrating an upper portion of the flush water supply device according to the seventh embodiment of the present invention, when viewed obliquely frontwardly from a rear side thereof, wherein the cover member is removed therefrom.
Figure 26:
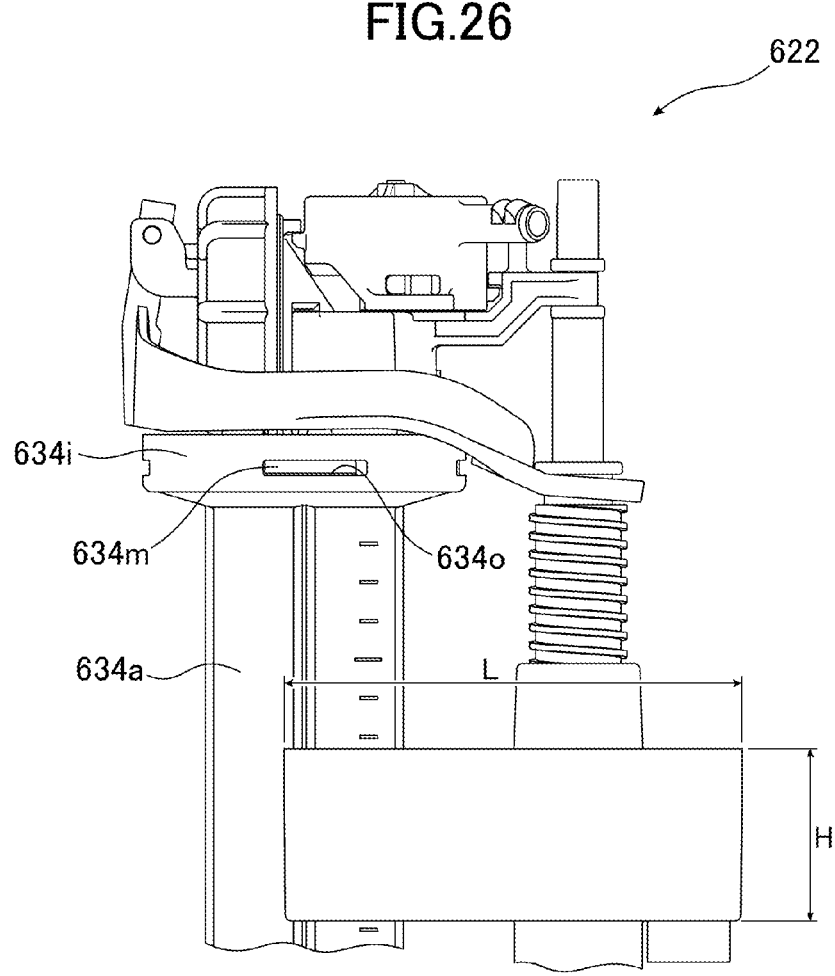
FIG. 26 is a front view illustrating the upper portion of the flush water supply device according to the seventh embodiment of the present invention, wherein the cover member is removed therefrom.
Figure 27:
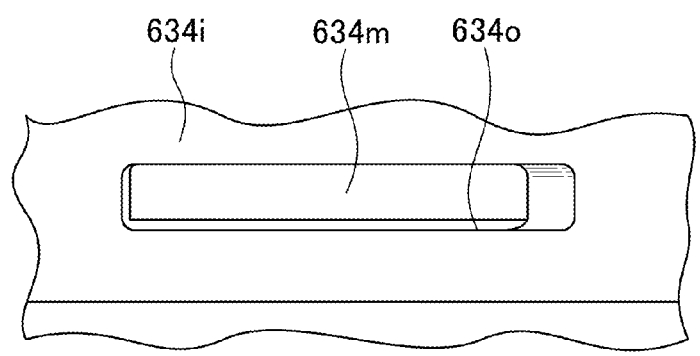
FIG. 27 is a fragmentary enlarged view illustrating a region of the flush water supply device according to the seventh embodiment of the present invention in FIG. 26, where a fitting protrusion formed on a front portion of an upper water supply pipe is fitted in a fitting hole formed in a front portion of a lower water supply pipe.
Figure 28:
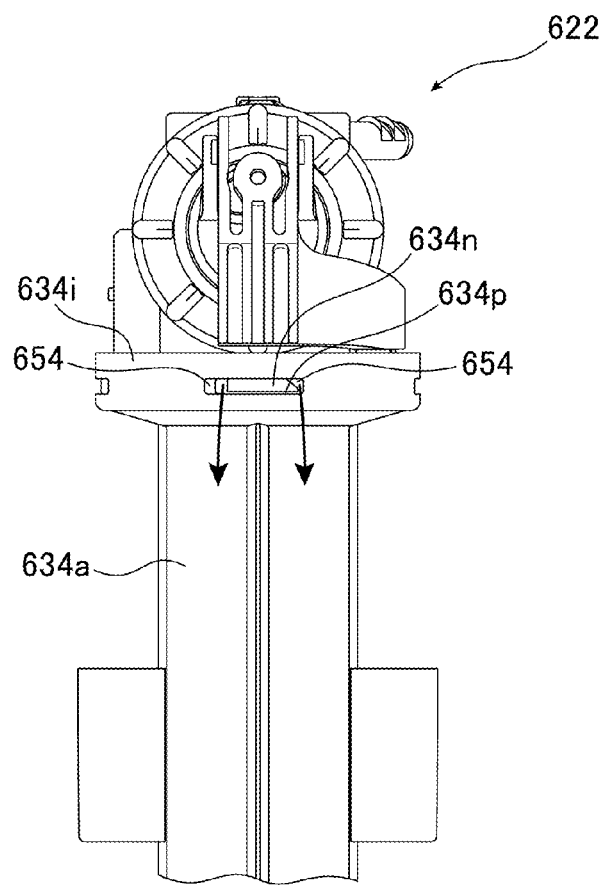
FIG. 28 is a side view illustrating the upper portion of the flush water supply device according to the seventh embodiment of the present invention, wherein the cover member is removed therefrom.
Figure 29:
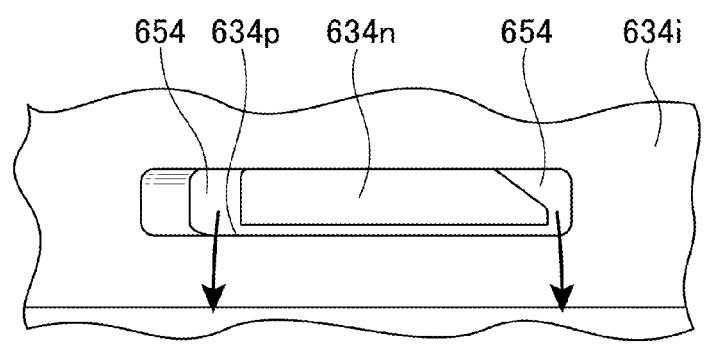
FIG. 29 is a fragmentary enlarged view illustrating a region of the flush water supply device according to the seventh embodiment of the present invention in FIG. 28, in which a fitting protrusion formed on a left lateral portion of the upper water supply pipe is fitted in a fitting hole formed in a left lateral portion of the lower water supply pipe.

FIG. 24 is a top plan view illustrating the flush water supply device according to the seventh embodiment of the present invention, wherein a cover member is removed therefrom, and FIG. 25 is a fragmentary exploded perspective view illustrating an upper portion of the flush water supply device according to the seventh embodiment of the present invention, when viewed obliquely frontwardly from a rear side thereof, wherein the cover member is removed therefrom. FIG. 26 is a front view illustrating the upper portion of the flush water supply device according to the seventh embodiment of the present invention, wherein the cover member is removed therefrom, and FIG. 27 is a fragmentary enlarged view illustrating an upper attaching region of a water supply pipe of the flush water supply device according to the seventh embodiment of the present invention in FIG. 26. FIG. 28 is a side view illustrating the upper portion of the flush water supply device according to the seventh embodiment of the present invention, wherein the cover member is removed therefrom, and FIG. 29 is a fragmentary enlarged view illustrating a region of the flush water supply device according to the seventh embodiment of the present invention in FIG. 28, where a fitting protrusion formed on a left lateral portion of an upper water supply pipe is fitted in a fitting hole formed in a left lateral portion of a lower water supply pipe.

As illustrated in FIGS. 24 and 25, a lower water supply pipe 634*a* has an upper end 634*i* formed as an annular-shaped concave portion 634*j* which protrudes outwardly and then protrudes upwardly from a distal end of the outwardly protruding portion. The concave portion 634*j* is formed to have an upper peripheral edge 634*k* located outward of an exit 636*g* of a pilot hole 636*f* of a water supply valve 636, in top plan view. This makes it possible to reliably receive flush water flowing out of the exit 636*g* of the pilot hole 636*f*, by the concave portion 634*j* at the upper end 634*i* of the lower water supply pipe 634*a*, thereby preventing flush water flowing out of the exit 636*g* of the pilot hole 636*f* from flowing into a small tank 638. Thus, it becomes possible to prevent the occurrence of an undesirable situation where, before a water-stopping water level WL1 within a water storage tank 618 reaches a prescribed water level necessary for toilet flushing, a water level within the small tank 638 is raised, and a float 642 is moved upwardly, so that the water supply valve 636 is prematurely closed, resulting in erroneous stopping of water supply.

Further, as illustrated in FIGS. 24 and 25, the small tank 638 and the float 642 are arranged on an opposite side of the exit 636*g* of the pilot hole 636*f* of the water supply valve 636 with respect to the lower water supply pipe 634*a*. Thus, even if flush water flows out of the exit 636*g* of the pilot hole 636*f* when the float 642 is moved downwardly and the water supply valve 636 operates to open the pilot hole 636*f*, it becomes possible to allow the flush water flowing out of the exit 636*g* of the pilot hole 636*f* to flow out on the opposite side of the small tank 638 and the float 642, thereby preventing the flush water flowing out of the exit 636*g* of the pilot hole 636*f* from flowing into the small tank 638.

Correspondingly, as illustrated in FIGS. 24 and 25, an upper water supply pipe 634b has an annular-shaped concave portion 634l which is provided at a height position approximately equal to an upper end of a filter member 650 installed inside a primary water supply passage of the upper water supply pipe 634b, and formed to protrude outwardly and then protrude upwardly from an distal end of the outwardly protruding portion. The annular-shaped concave portion 634l of the upper water supply pipe 634b has total four fitting protrusions: two front and rear fitting protrusions 634m and two right and left fitting protrusions 634n, which are formed to protrude outwardly from an outer peripheral surface of the concave portion 634l and arranged at even intervals along a circumferential direction of concave portion 634l.

Correspondingly, the concave portion 634j at the upper end 634i of the lower water supply pipe 634a has total four fitting holes: two front and rear fitting holes 634o and two right and left fitting holes 634p, which are formed in an outer peripheral surface of the concave portion 634j and arranged at even intervals along a circumferential direction of concave portion 634j. When the upper water supply pipe 634b is insertingly attached to the lower water supply pipe 634a from thereabove, each of the fitting protrusions 634m, 634n of the upper water supply pipe 634b is fitted into a corresponding one of the fitting holes 634o, 634p of the lower water supply pipe 634a.

As illustrated in FIGS. 26 and 27, each of the fitting protrusions 634m of the upper water supply pipe 634b is fitted in a corresponding one of the fitting holes 634o of the lower water supply pipe 634a without a gap therebetween.

On the other hand, as illustrated in FIGS. 28 and 29, each of the fitting protrusions 634n of the upper water supply pipe 634b is fitted in a corresponding one of the fitting holes 634p of the lower water supply pipe 634a, to define therebetween a drain port 654 for allowing water to pass therethrough in a direction from an inside of the concave portion 634j at the upper end 634a of the lower water supply pipe 634a to the outside. In FIGS. 28 and 29, a flow of water flowing out of the drain port 654 on a left lateral side of the upper end 634i of the lower water supply pipe 634a is indicated by the arrowed lines.

Any fitting protrusion other than the fitting protrusions 634n of the upper water supply pipe 634b and any corresponding fitting hole other than the fitting holes 634p of the lower water supply pipe 634a are fitted together without a gap therebetween, i.e., the drain port 654 for allowing water to pass therethrough in the direction from the inside of the concave portion 634j at the upper end 634a of the lower water supply pipe 634a to the outside is not defined therebetween.

That is, the drain port 654 for allowing water to pass therethrough in the direction from the inside of the concave portion 634j at the upper end 634a of the lower water supply pipe 634a to the outside is arranged on the opposite side of the small tank 638 and the float 642 with respect to the lower water supply pipe 634a. Therefore, flush water received by the concave portion 634j at the upper end 634i of the lower water supply pipe 634a after flowing out of the exit 636g of the pilot hole 636f is drained from the drain ports 654 to the opposite side of the small tank 638 and the float 642 with respect to the lower water supply pipe 634a, so that it becomes possible to prevent flush water flowing out of the exit 636g of the pilot hole 636f from flowing into the small tank 638. Thus, it becomes possible to prevent the occurrence of the undesirable situation where, before the water-stopping water level WL1 within the water storage tank 618 reaches a prescribed water level necessary for toilet flushing, the water level within the small tank 638 is raised, and the float 642 is moved upwardly, so that the water supply valve 636 is prematurely closed, resulting in erroneous stopping of water supply.

As illustrated in FIGS. 24 and 26, the small tank 638 is formed in a generally horizontally-long flattened shape in which a maximum vertical length H becomes less than a maximum horizontal (longitudinal) length L by a given value. A ratio of the maximum vertical length H to the maximum horizontal (longitudinal) length L of the small tank 638 (hereinafter referred to as "vertical to horizontal ratio H/L") is set, preferably, in the range of 1/2.25 to 1/2.28. In this case, based on the small tank 638 having a flattened shape in which a maximum vertical length becomes less than a maximum horizontal length by a given value, it becomes possible to shorten a time period required for fully storing flush water therein after the water level within the water storage tank 618 is raised to cause a check valve 640 to close an opening 638b formed in a bottom wall 638a of the small tank 638. Therefore, supposing that flush water flowing out of the pilot hole 636f of the water supply valve 636 flows into the small tank 638, an amount of the flush water to be received by and stored in the small tank 638 can be reduced. Thus, it becomes possible to prevent the occurrence of the undesirable situation where, before the water-stopping water level within the water storage tank 618 reaches a prescribed water level necessary for toilet flushing, the water level within the small tank 638 is raised, and the float 642 is moved upwardly, so that the water supply valve 636 is prematurely closed, resulting in erroneous stopping of water supply.

Further, a height dimension of the small tank 638 effective in capacity can be set to a relatively small value. Thus, when the water level within the water storage tank 618 is raised, and flush water flows into the small tank 638, it becomes possible to rapidly store water, as compared to a small tank having a non-flattened shape, so as to quickly move the small tank 638 upwardly and promptly stop the water supply valve 636 to establish a water stopping state.

Further, supposing that flush water flowing out of the exit 636g of the pilot hole 636f of the water supply valve 636 flows into the small tank 638, the flush water will flow into the small tank 638 after the water-stopping water level WL1 within the water storage tank 418 reaches the prescribed water level necessary for toilet flushing, and the water level within the small tank 638 is raised to establish the water stopping state. This makes it possible to prevent the occurrence of the undesirable situation where, before the water-stopping water level WL1 within the water storage tank 618 reaches the prescribed water level necessary for toilet flushing, the water level within the small tank 638 is raised, and the float 642 is moved upwardly, so that the water supply valve 636 is prematurely closed, resulting in erroneous stopping of water supply.

In the flush water supply device 622 according to the seventh embodiment of the present invention, the small tank 638 and the float 642 are arranged on the opposite side of the exit 636g of the pilot hole 636f of the water supply valve 636 with respect to the water supply pipe 634. Thus, even if flush water flows out of the exit 636g of the pilot hole 636f when the float 642 is moved downwardly and the water supply valve 636 operates to open the pilot hole 636f, it becomes possible to allow the flush water flowing out of the exit 636g of the pilot hole 636f to flow out on the opposite side of the small tank 638 and the float 642, thereby preventing the flush water flowing out of the exit 636g of the pilot hole 636f from flowing into the small tank 638. This makes it possible to prevent the occurrence of the undesirable situation where, before the water-stopping water level WL1 within the water storage tank 618 reaches the prescribed water level necessary for toilet flushing, the water level within the small tank 638 is raised, and the float 642 is moved upwardly, so that the water supply valve 636 is prematurely closed, resulting in erroneous stopping of water supply. In addition, it becomes possible to eliminate a need for providing a member for preventing flush water flowing out of the exit 636g of the pilot hole 636f from flowing into the small tank 638, thereby avoiding an increase in entire size of the flush water supply device 622, and suppressing an increase in production cost of the flush water supply device 622.

In the flush water supply device 622 according to the seventh embodiment, the upper end 634i of the lower water supply pipe 634a is formed as the annular-shaped concave portion 634j which protrudes outwardly and then protrudes upwardly from a distal end of the outwardly protruding portion, and the upper peripheral edge 634k of the concave portion 634j is located outward of the exit 636g of the pilot hole 636f of the water supply valve 636, in top plan view. This makes it possible to reliably receive flush water flowing out of the exit 636g of the pilot hole 636f, by the concave portion 634j at the upper end 634i of the lower water supply pipe 634a, thereby preventing flush water flowing out of the exit 636g of the pilot hole 636f from flowing into the small tank 638. Thus, it becomes possible to prevent the occurrence of the undesirable situation where, before the water-stopping water level WL1 within the water storage tank 618 reaches a prescribed water level necessary for toilet flushing, the water level within the small tank 638 is raised, and the float 642 is moved upwardly, so that the water supply valve 636 is prematurely closed, resulting in erroneous stopping of water supply.

In the flush water supply device 622 according to the seventh embodiment, flush water received by the concave portion 634j at the upper end 634i of the lower water supply pipe 634a after flowing out of the exit 636g of the pilot hole 636f is drained from the drain ports 654 formed on the lateral surface of the concave portion 634j at the upper end 634i of the lower water supply pipe 634a, to the opposite side of the small tank 638 and the float 642 with respect to the lower water supply pipe 634a, so that it becomes possible to prevent flush water flowing out of the exit 636g of the pilot hole 636f from flowing into the small tank 638. Thus, it becomes possible to prevent the occurrence of the undesirable situation where, before the water-stopping water level WL1 within the water storage tank 618 reaches a prescribed water level necessary for toilet flushing, the water level within the small tank 638 is moved upwardly, so that the water supply valve 636 is prematurely closed, resulting in erroneous stopping of water supply.

In the flush water supply device 622 according to the seventh embodiment, based on the small tank 638 having a flattened shape in which a maximum vertical length H becomes less than a maximum horizontal length L by a given value, it becomes possible to shorten a time period required for fully storing flush water therein after the water level within the water storage tank 618 is raised to cause the check valve 640 to close the opening 638b formed in the bottom wall 638a of the small tank 638. Therefore, supposing that flush water flowing out of the pilot hole 636f of the water supply valve 636 flows into the small tank 638, an amount of the flush water to be received by and stored in the small tank 638 can be reduced. Thus, it becomes possible to prevent the occurrence of the undesirable situation where, before the water-stopping water level within the water storage tank 618 reaches a prescribed water level necessary for toilet flushing, the water level within the small tank 638 is raised, and the float 642 is moved upwardly, so that the water supply valve 636 is prematurely closed, resulting in erroneous stopping of water supply.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. A flush water supply device for supplying flush water to a flush water tank of a toilet, comprising:
    a water supply unit which includes a water supply pipe having an upstream end connected to an external water supply source, and a water supply valve provided above and in laterally offset relation to the water supply pipe and adapted to be switchable between a water supplying state and a water stopping state with respect of an inside of the flush water tank, in terms of flush water supplied from the water supply pipe;
    a water compartment fittingly attached to the water supply unit and adapted to hold therein flush water, the water compartment being formed with a small hole for draining flush water in the water compartment;
    a check valve attached to a mounting hole formed in a bottom wall of the water compartment, the check valve being configured to open and close the small hole of the water compartment when the check valve is moved upwardly and downwardly according to a change in water level within the flush water tank;
    a float provided inside the water compartment and adapted to be moved upwardly and downwardly according to a change in water level within the water compartment; and
    a swingable member having one end connected to the float and the other end connected to the water supply valve of the water supply unit, the swingable member being adapted, according to the upward and downward movements of the float, to be swingably moved about a fulcrum located adjacent to the water supply valve, thereby causing opening and closing of the water supply valve,
    wherein the water compartment is formed in a flattened shape in which a maximum vertical length becomes less than a maximum horizontal length by a given value; and
    wherein the water supply valve is disposed on a laterally opposite side of the float with respect to the water supply pipe so that a ratio (lever ratio L1/L2) of a distance (L1) between the fulcrum adjacent to the water supply valve and an effort point defined by the swingable member and the float, to a distance (L2) between the fulcrum adjacent to the water supply valve and a load point defined by the swingable member and the water supply valve is set to a given value or more;
    wherein the bottom wall of the water compartment is formed with a tubular member extending upwardly while surrounding a periphery of the mounting hole; and
    wherein the tubular member is formed to have an upper end opened upwardly, and disposed inside the float, the upper end of the tubular member being located above a lower end of the float in a situation where the float is moved upwardly during the water stopping state and then located at a position where a balance between a self-weight of the float and buoyancy based on flush water in the water compartment is achieved.

2. The flush water supply device as defined in claim 1, wherein the check valve is made of a material having a specific gravity less than that of water, so as to become capable of being moved upwardly and downwardly depending on a flush water level within the flush water tank.

3. The flush water supply device as defined in claim 1, wherein the bottom wall of the water compartment is formed with a small hole for draining flush water therethrough, in addition to the opening.

4. The flush water supply device as defined in claim 1, wherein the check valve has a small hole formed in a central region of the check valve to penetrate therethrough in an up-down direction of the check valve.

5. The flush water supply device as defined in claim 1, wherein the check valve has:
a buoyancy producing section for producing buoyancy based on flush water in the flush water tank;
a support section inserted into the mounting hole and adapted to be slidingly movable along the mounting hole in an up-down direction according to the buoyancy produced by the buoyancy producing section; and
a valve section adapted to be moved upwardly and downwardly according to a change in water level within the flush water tank, thereby closing and opening the small hole of the water compartment,
and wherein the support section of the check valve has a lockable portion adapted to be locked by the upper end of the tubular member when the check valve is moved downwardly to a lowermost position with respect to the water compartment.

6. The flush water supply device as defined in claim 1, wherein the check valve has:
a buoyancy producing section for producing buoyancy based on flush water in the flush water tank;
a support section inserted into the mounting hole and adapted to be slidingly movable along the mounting hole in an up-down direction according to the buoyancy produced by the buoyancy producing section; and
a valve section adapted to be moved upwardly and downwardly according to a change in water level within the flush water tank, thereby closing and opening the small hole of the water compartment,
and wherein:
the support section of the check valve has a lockable portion adapted to be locked by a portion of the tubular member when the check valve is moved downwardly to a lowermost position with respect to the water compartment; and
the tubular member has a locking stopper portion for locking the lockable portion of the support section of the check valve.

7. The flush water supply device as defined in claim 1, wherein the water compartment is detachably attached to a lateral side of the water supply pipe which is fixedly attached to the flush water tank.

8. The flush water supply device as defined in claim 1, wherein:
the water supply pipe has a convex portion formed to protrude outwardly from a lateral surface thereof and extend upwardly from a given height position of the water supply pipe; and
the water compartment has a fitting portion fittingly engageable with a lateral surface of the water supply pipe, wherein a surface of the fitting portion opposed to the lateral surface of the water supply pipe has a recess formed to have a concave shape and extend in an up-down direction, in a manner fittingly engageable with the convex portion of the water supply pipe.

9. The flush water supply device as defined in claim 1, wherein:
the water supply pipe has a recess formed to have a shape concaved inwardly from a lateral surface thereof and extend upwardly from a given height position of the water supply pipe; and
the water compartment has a fitting portion fittingly engageable with a lateral surface of the water supply pipe, wherein a surface of the fitting portion opposed to the lateral surface of the water supply pipe has a convex portion formed to have a convex shape and extend in an up-down direction, in a manner fittingly engageable with the recess of the water supply pipe.

10. The flush water supply device as defined in claim 7, wherein:
the water compartment is formed to partially surround an outer peripheral surface of the water supply pipe in a state in which the water compartment is fittingly engaged with the water supply pipe, and an internal shape of the water compartment for receiving therein flush water is formed in a C shape in top plan view; and
the float is formed in conformity to the internal shape of the water compartment.

11. The flush water supply device as defined in claim 1, wherein:
the water supply valve is a diaphragm-operated water supply valve provided above and in laterally offset relation to the water supply pipe, the water supply valve being formed with a pilot hole communicating with the water supply pipe and extending in an approximately horizontal direction, and adapted to be moved in a horizontal direction so as to open and close the pilot hole in a manner switchable between the water supplying state and the water stopping state with respect to the inside of the flush water tank;
the water compartment is opened upwardly, and adapted to hold therein flush water while being fittingly engaged with the water supply pipe; and
the float is provided inside the water compartment and adapted to be moved upwardly and downwardly according to a change in water level within the water compartment, thereby cause the water supply valve to close and open the pilot hole,
and wherein the water compartment and the float are disposed on an opposite side of an exit of the pilot hole of the water supply valve with respect to the water supply pipe.

12. The flush water supply device as defined in claim 11, wherein the water supply pipe has an upper end formed as a concave portion which protrudes outwardly and then protrudes upwardly from a distal end of the outwardly protruding portion, the concave portion being formed to have an upper peripheral edge located outward of the exit of the pilot hole of the water supply valve, in top plan view.

13. The flush water supply device as defined in claim 12, wherein the concave portion at the upper end of the water supply pipe has a drain port formed in a lateral wall thereof at a position on an opposite side of the water compartment and the float with respect to the water supply pipe, to drain flush water in the concave portion.

14. A flush water tank assembly comprising the flush water supply device as defined in claim 1.

15. A flush toilet comprising the flush water tank assembly as defined in claim 14.

16. The flush water supply device as defined in claim 1, wherein the ratio (lever ratio L1/L2) of the distance (L1) between the fulcrum adjacent to the water supply valve and the effort point defined by the swingable member and the float, to the distance (L2) between the fulcrum adjacent to the water supply valve and the load point defined by the swingable member and the water supply valve is at least 13.

17. The flush water supply device as defined in claim 1, wherein the swingable member horizontally extends from the laterally opposite side to a same side of the float so that the ratio (lever ratio L1/L2) of the distance (L1) between the fulcrum adjacent to the water supply valve and the effort point defined by the swingable member and the float, to the distance (L2) between the fulcrum adjacent to the water supply valve and the load point defined by the swingable member and the water supply valve is set to the given value or more.

18. A flush water supply device for supplying flush water to a flush water tank of a toilet, comprising:
- a water supply unit which includes a water supply pipe having an upstream end connected to an external water supply source, and a water supply valve provided above and in laterally offset relation to the water supply pipe and adapted to be switchable between a water supplying state and a water stopping state with respect of an inside of the flush water tank, in terms of flush water supplied from the water supply pipe;
- a water compartment fittingly attached to the water supply unit and adapted to hold therein flush water, the water compartment being formed with a small hole for draining flush water in the water compartment;
- a check valve attached to a mounting hole formed in a bottom wall of the water compartment, the check valve being configured to open and close the small hole of the water compartment when the check valve is moved upwardly and downwardly according to a change in water level within the flush water;
- a float provided inside the water compartment and adapted to be moved upwardly and downwardly according to a change in water level within the water compartment; and
- a swingable member having one end connected to the float and the other end connected to the water supply valve of the water supply unit, the swingable member being adapted, according to the upward and downward movements of the float, to be swingably moved about a fulcrum located adjacent to the water supply valve, thereby causing opening and closing of the water supply valve,
- wherein: the water compartment is formed in a flattened shape in which a maximum vertical length becomes less than a maximum horizontal length by a given value;
- wherein the water supply valve is disposed on a laterally opposite side of the float with respect to the water supply pipe so that a ratio (lever ratio L1/L2) of a distance (L1) between the fulcrum adjacent to the water supply valve and an effort point defined by the swingable member and the float, to a distance (L2) between the fulcrum adjacent to the water supply valve and a load point defined by the swingable member and the water supply valve is set to a given value or more;
- wherein the bottom wall of the water compartment is formed with a tubular member extending upwardly while surrounding a periphery of the mounting hole; and
- wherein the tubular member is formed to have an upper end opened upwardly, and disposed outside an internal space of the float, the upper end of the tubular member being located above a water level within the water compartment during the water stopping state.

19. A flush water supply device for supplying flush water to a flush water tank of a toilet, comprising:
- a water supply unit which includes a water supply pipe having an upstream end connected to an external water supply source, and a water supply valve provided above and in laterally offset relation to the water supply pipe and adapted to be switchable between a water supplying state and a water stopping state with respect of an inside of the flush water tank, in terms of flush water supplied from the water supply pipe;
- a water compartment fittingly attached to the water supply unit and adapted to hold therein flush water, the water compartment being formed with a small hole for draining flush water in the water compartment;
- a check valve attached to a mounting hole formed in a bottom wall of the water compartment, the check valve being configured to open and close the small hole of the water compartment when the check valve is moved upwardly and downwardly according to a change in water level within the flush water tank;
- a float provided inside the water compartment and adapted to be moved upwardly and downwardly according to a change in water level within the water compartment; and
- a swingable member having one end connected to the float and the other end connected to the water supply valve of the water supply unit, the swingable member being adapted, according to the upward and downward movements of the float, to be swingably moved about a fulcrum located adjacent to the water supply valve, thereby causing opening and closing of the water supply valve,
- wherein: the water compartment is formed in a flattened shape in which a maximum vertical length becomes less than a maximum horizontal length by a given value;
- wherein the water supply valve is disposed on a laterally opposite side of the float with respect to the water supply pipe so that a ratio (lever ratio L1/L2) of a distance (L1) between the fulcrum adjacent to the water supply valve and an effort point defined by the swingable member and the float, to a distance (L2) between the fulcrum adjacent to the water supply valve and a load point defined by the swingable member and the water supply valve is set to a given value or more;
- wherein the bottom wall of the water compartment is formed with a tubular member extending upwardly while surrounding a periphery of the mounting hole; and
- wherein the tubular member is formed to have an upper end closed upwardly.

* * * * *